United States Patent [19]

Nakazato et al.

[11] Patent Number: 5,572,357
[45] Date of Patent: Nov. 5, 1996

[54] OPTICAL SYSTEM FOR AMPLIFYING SIGNAL LIGHT

[75] Inventors: Koji Nakazato; Masayuki Nishimura, both of Yokohama, Japan

[73] Assignee: Sumitomo Electric Industries, Ltd., Osaka, Japan

[21] Appl. No.: 389,698

[22] Filed: Feb. 14, 1995

[30] Foreign Application Priority Data

Feb. 14, 1994 [JP] Japan .................................. 6-017690

[51] Int. Cl.$^6$ .................................. H01S 3/02; H01S 3/10
[52] U.S. Cl. .................................. 359/341; 357/174; 372/6
[58] Field of Search .................................. 359/124, 134, 359/160, 174, 341; 372/6

[56] References Cited

U.S. PATENT DOCUMENTS

| | | | |
|---|---|---|---|
| 5,239,607 | 8/1993 | da Silva et al. | 359/341 |
| 5,283,686 | 2/1994 | Huber | 359/341 |
| 5,337,382 | 8/1994 | Mizrahi | 385/37 |
| 5,392,153 | 2/1995 | Delavaux | 359/341 |
| 5,404,413 | 4/1995 | Delavaux et al. | 359/341 |
| 5,406,411 | 4/1995 | Button et al. | 359/341 |
| 5,481,391 | 1/1986 | Giles | 359/174 |

FOREIGN PATENT DOCUMENTS

| | | |
|---|---|---|
| 4217233 | 8/1992 | Japan . |
| 7177096 | 7/1995 | Japan . |

OTHER PUBLICATIONS

Sato et al., "OTDR in Optical Amplifier Transmission Systems Using EDFAs Containing Optical Circulators", pp. 268–271.

Nishi et al., "Highly Efficient Configuration of Erbium-Doped Fiber Amplifier", pp. 99–102.

Chernikov et al., "Coupled–Cavity Erbium–Fiber Lasers Incorporating Fiber–Grating Reflectors", OFC '94 Technical Digest, Tuesday Afternoon, pp. 23–24.

Primary Examiner—Nelson Moskowitz
Attorney, Agent, or Firm—Cushman Darby & Cushman, L.L.P.

[57] ABSTRACT

An optical amplifier for amplifying light having first and second signals includes an optical circulator for outputting light input from a first port through a second port, and outputting light input from the second port through a third port. A first amplifier for amplifying light passing therethrough is connected to the second port. A second amplifier for amplifying light passing therethrough is connected to the first amplifier. A first reflector for reflecting the first light signal, and transmitting the second light signal is arranged between the first and second amplifiers and a second reflector for reflecting the second light signal is arranged such that the second amplifier is located between the first and second reflectors. A separate branch may be connected to compensate for time difference experienced by the first and second signals when traveling through the first and second amplifiers.

29 Claims, 19 Drawing Sheets

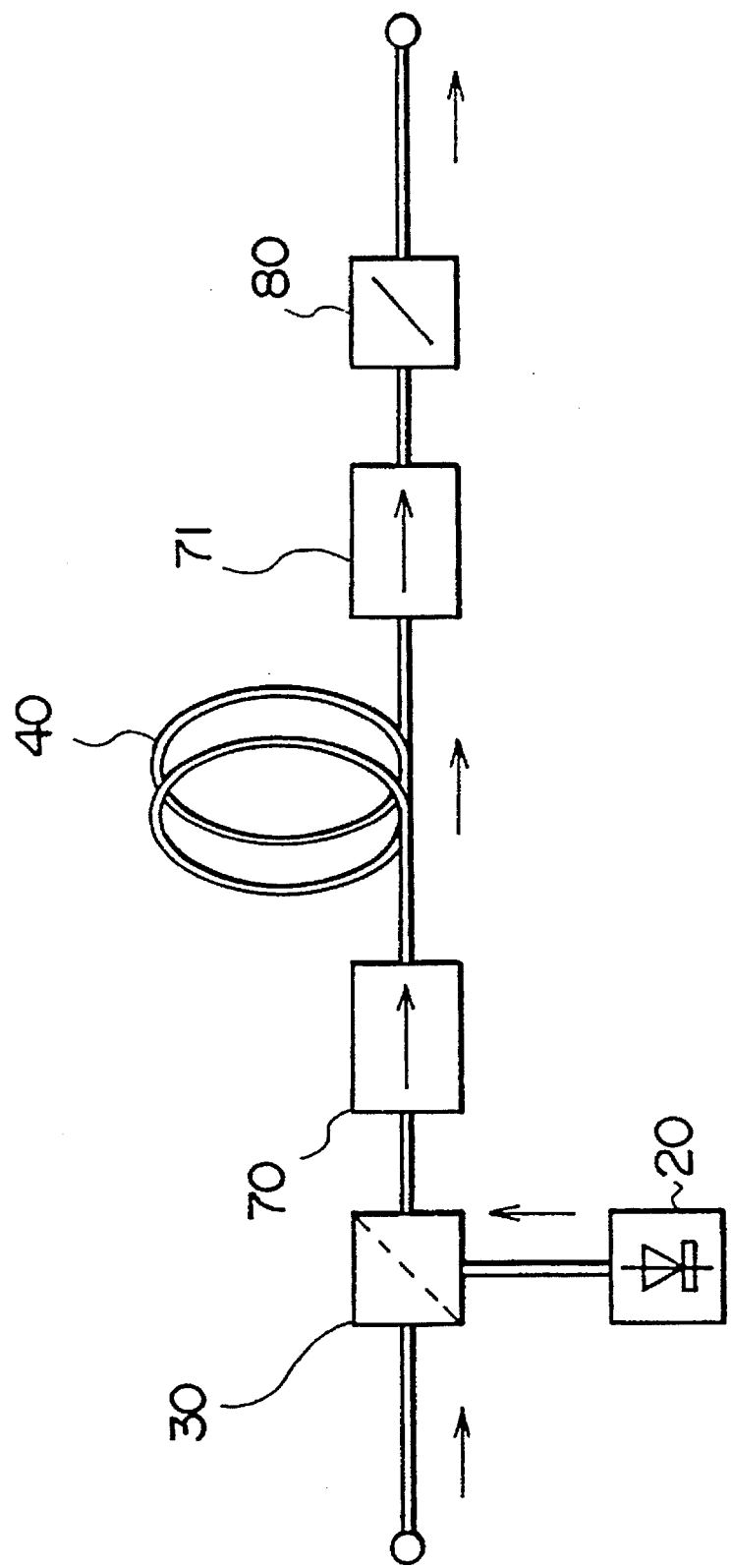

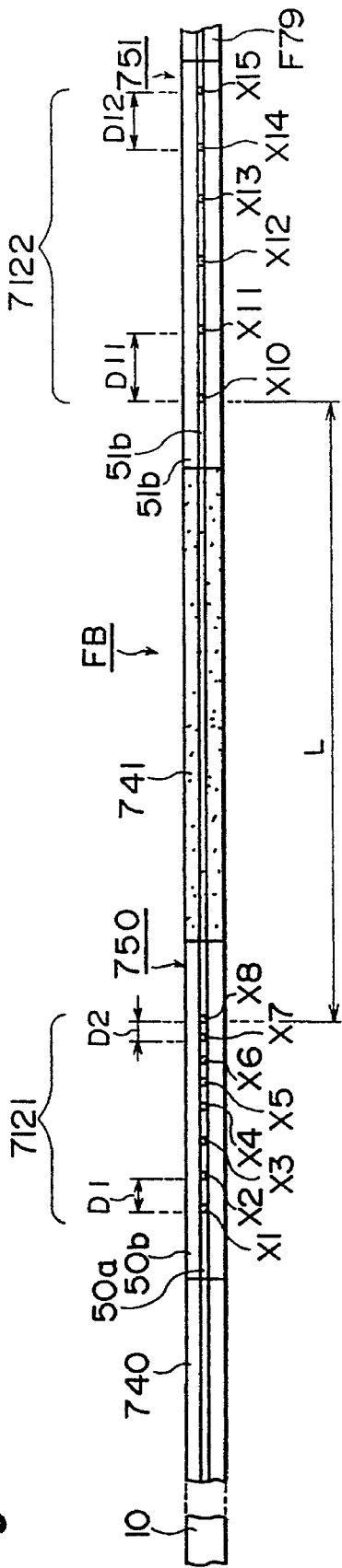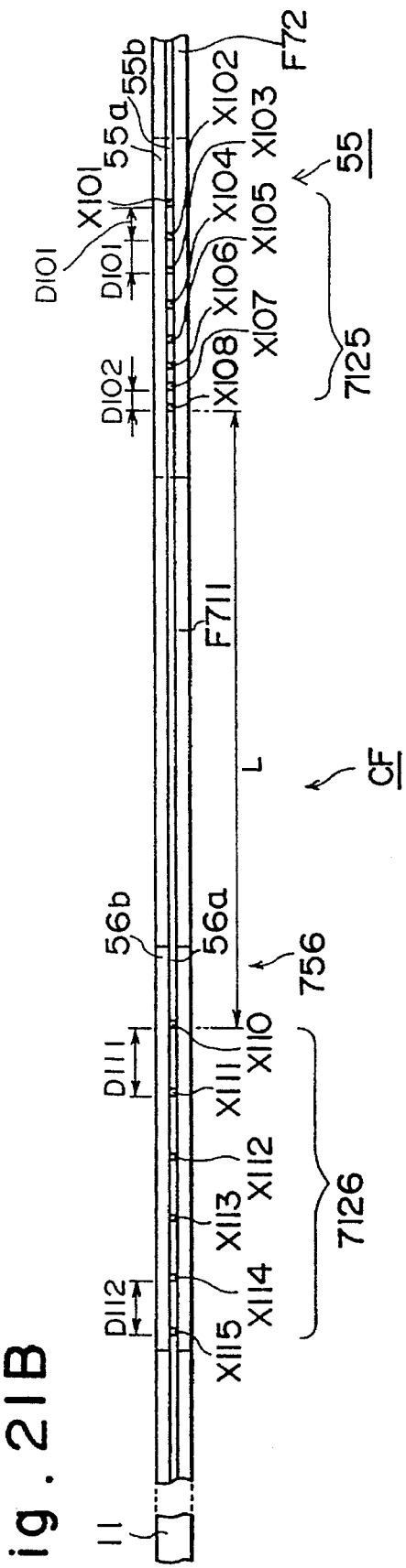

5,572,357

OPTICAL SYSTEM FOR AMPLIFYING SIGNAL LIGHT

BACKGROUND OF THE INVENTION

1. Field of the Invention

The present invention relates to an optical fiber amplifier for directly amplifying signal light in an optical communication system and, more particularly, to an optical amplifier used in wavelength division multiplex communication.

2. Related Background Art

As conventional optical fiber amplifiers, arrangements based on various pumping schemes have been developed. A conventional optical amplifier is disclosed in "Optical Amplifier and Its Applications", OHMSHA, LTD., edited by Hideki Ishio, pp. 111.

SUMMARY OF THE INVENTION

The present inventors have developed a new optical amplification system. The amplification factor of a light signal amplified by an amplification optical fiber is dependent on the wavelength of the light signal. Consider a case wherein light signals having different wavelengths are transferred. Assume that these light signals are first and second light signals. When the amplification factor of the first light signal which has passed through an amplification fiber having a length L is A, the amplification factor of the second light signal which has passed through an amplification fiber having the same length as the length L is not A.

In this system, the amplification factors of these light signals are made constant regardless of the wavelengths. This apparatus is an optical transmission system for amplifying signal light containing the first and second light signals respectively having first and second wavelengths.

When the signal light including the first and second light signals is input to a first amplification fiber, the first and second light signals are amplified. In this case, a first reflecting means for selectively reflecting the first light signal is arranged at the exit termination of the first amplification fiber. The first light signal reflected by the first reflector reciprocates in the first amplification fiber. As a result, the intensity of the first light signal is amplified.

Meanwhile, the second light signal transmitted through the first reflector is input to a second amplification fiber connected to the first amplification fiber. A second reflector for selectively reflecting the second light signal is arranged at a termination of the second amplification fiber. The second light signal reflected by the second reflector reciprocates in the first and second amplification fibers. As a result, the intensity of the second light signal is amplified. The amplification factor of signal light is dependent on the lengths of these amplification fibers. Therefore, in this system, the amplification factors of the first and second light signals having different wavelengths are independently controlled.

That is, this system includes:

(a) a first optical circulator, having first, second, and third ports, wherein light input through the first port is output through the second port, and wherein light input through the second port is output through the third port;

(b) a first amplification fiber for amplifying light passing therethrough, the first amplification fiber being connected to the second port of the first optical circulator;

(c) a second amplification fiber for amplifying light passing therethrough, the second amplification fiber being connected to the first amplification fiber;

(d) a first reflector for connecting the first amplification fiber to the second amplification fiber, the first reflector reflecting the first light signal, and transmitting the second light signal; and (e) a reflector for selectively reflecting the second light signal, the second reflector being connected to the second amplification fiber such that the second amplification fiber is arranged between the first and second reflector.

In this arrangement, the signal light input through the first port of the first optical circulator is output from the second port of the first optical circulator, and the first light signal of the signal light output from the second port of the first optical circulator reciprocates in the first amplification fiber to be amplified. The second light signal of the signal light output from the second port of the first optical circulator reciprocates in the first and second amplification fibers to be amplified. The amplified light signals are output from the third port of the first optical circulator. Therefore, the first and second light signals having different wavelengths are amplified at a uniform amplification factor.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 10 is a view showing the arrangement of an optical fiber amplifier of a forward pumping scheme;

FIG. 21A and 21B show the fibers shown in FIG. 18.

DETAILED DESCRIPTION OF THE PREFERRED EMBODIMENTS

Figure 1:
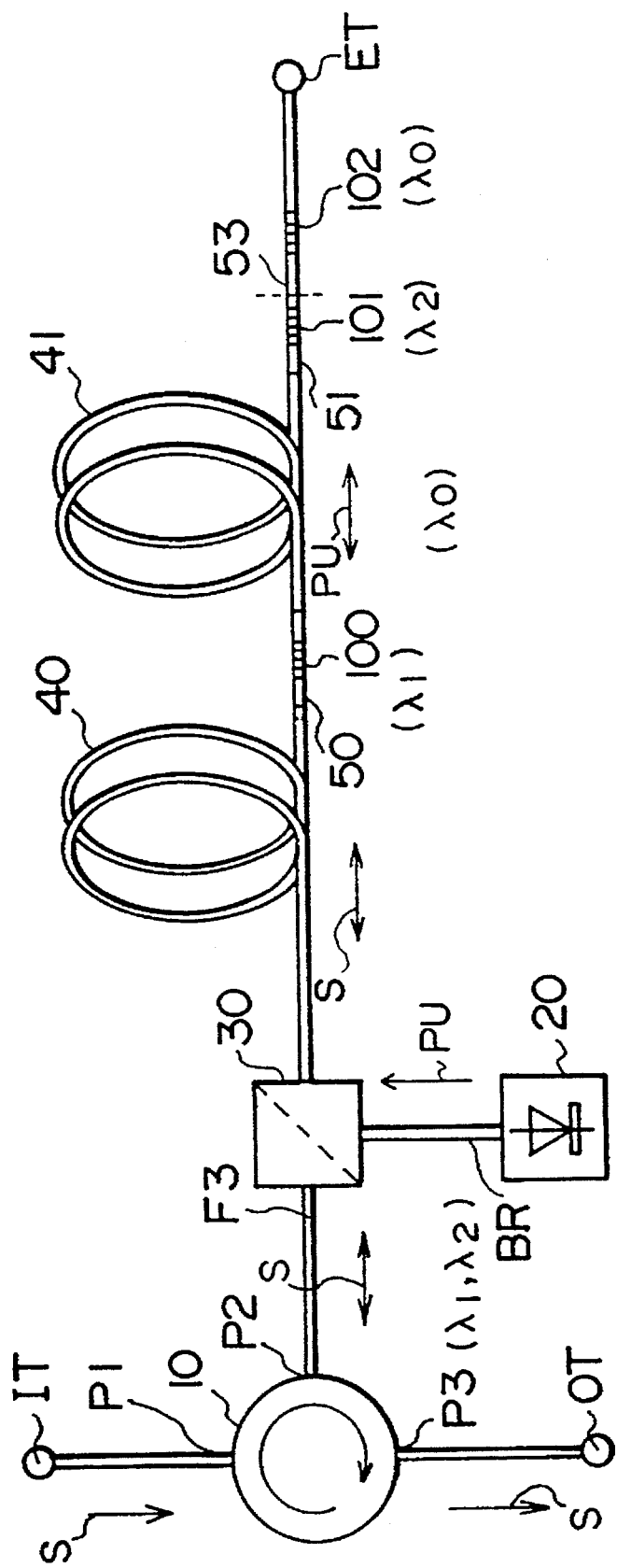
FIG. 1 is a view showing the arrangement of an optical fiber amplifier according to the first embodiment of the present invention.

A system according to the present invention will be described below, together with the systems shown in FIGS. 10 to 13 as comparative examples.

First, the systems shown in FIGS. 10 to 13 as comparative examples will be described.

FIG. 10 shows an optical fiber amplifier of a forward pumping scheme. Pump light emitted from a pump light source 20 is output to an amplification fiber 40 via an optical multiplexing/demultiplexing unit 30 in a direction coinciding with the traveling direction of signal light. As a result, an active substance for optical amplification, which is doped into the amplification fiber 40 is pumped to cause population inversion. In this case, the signal light input from the incident termination to one termination of the amplification optical fiber 40 via an optical multiplexing/demultiplexing unit 30 and an optical isolator 70 is amplified by stimulated emission of the active substance. The amplified signal light is output from the other termination of the amplification optical fiber 40 and output to the exit termination via an optical isolator 71 and an optical filter 80.

Figure 11:
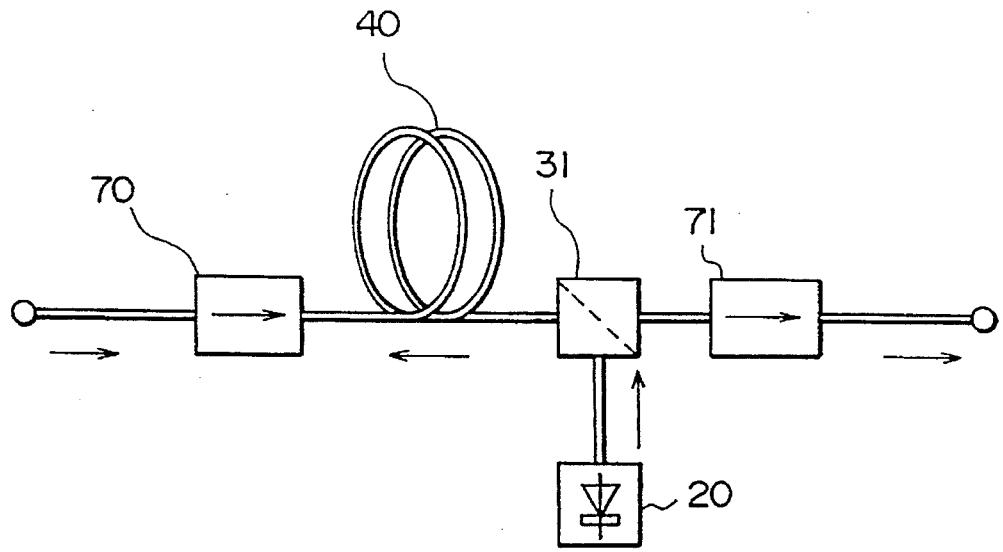
FIG. 11 is a view showing the arrangement of an optical fiber amplifier of a backward pumping scheme.

FIG. 11 shows an optical fiber amplifier of a backward pumping scheme. Unlike the forward pumping scheme, pump light is output to an amplification optical fiber 40 via an optical multiplexing/demultiplexing unit 31 in a direction opposite to the traveling direction of signal light.

Figure 12:
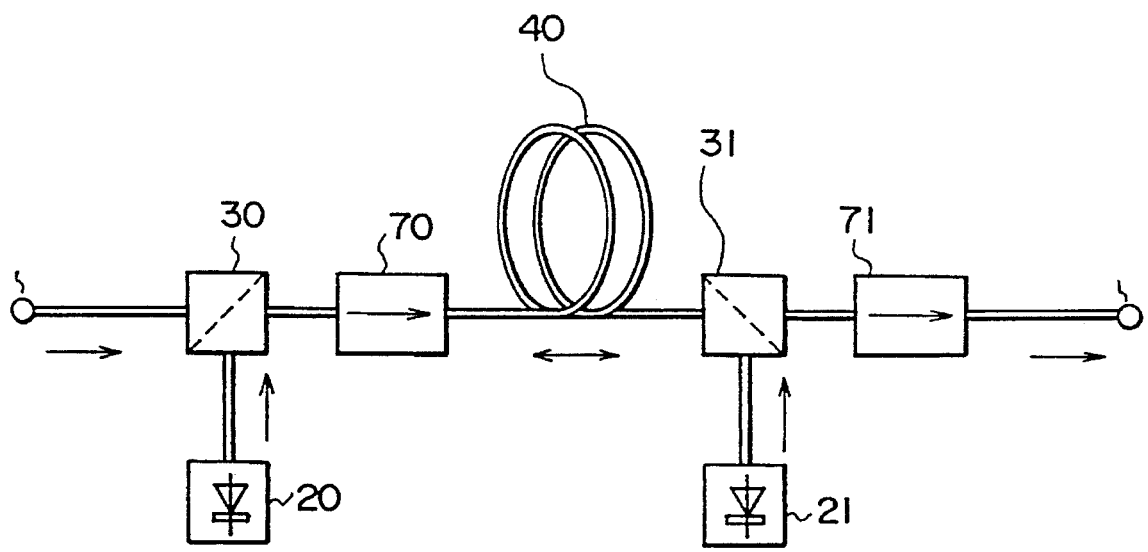
FIG. 12 is a view showing the arrangement of an optical fiber amplifier of a bidirectional pumping scheme.

FIG. 12 shows an optical fiber amplifier of a bidirectional pumping scheme. Unlike the forward or backward pumping scheme, pump light beams emitted from pump light sources 20 and 21 are respectively output to the two terminations of an amplification optical fiber 40 via optical multiplexing/demultiplexing units 30 and 31.

Figure 13:
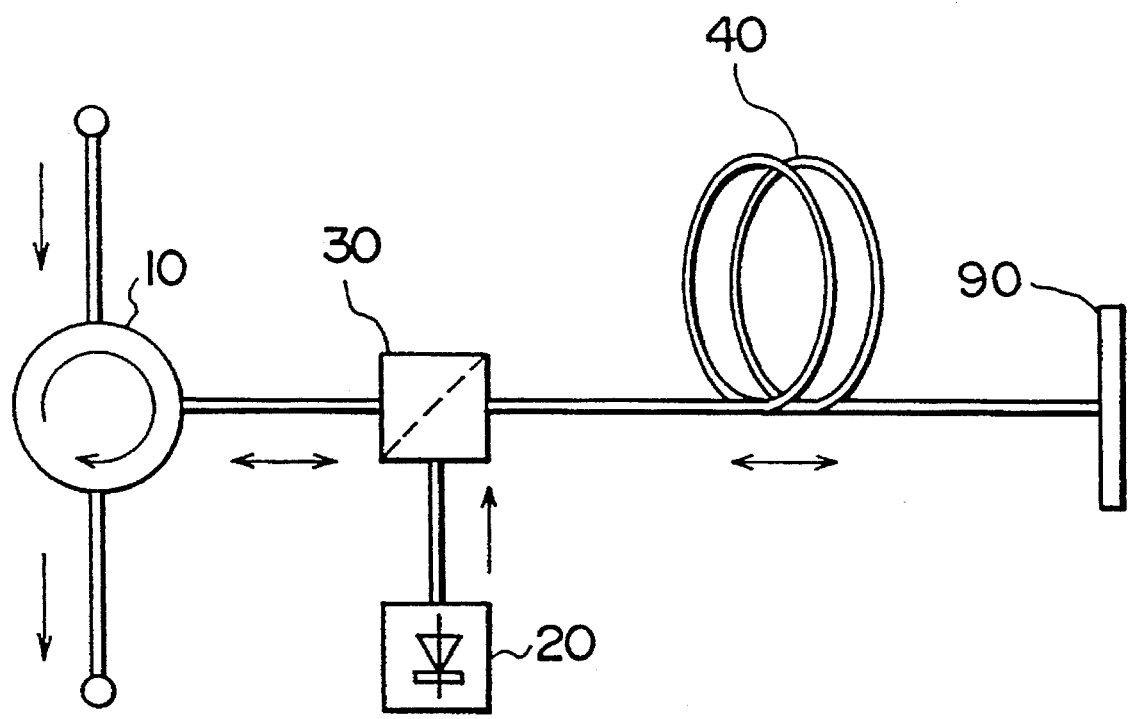
FIG. 13 is a view showing the arrangement of an optical fiber amplifier of a reflection pumping scheme.

FIG. 13 shows an optical fiber amplifier of a reflection pumping scheme. Pump light emitted from a pump light source 20 is output to one termination of an amplification optical fiber 40 via an optical multiplexing/demultiplexing unit 30 and reflected by a reflecting mirror 90 at the other termination of the amplification optical fiber 40. As a result, an active substance for optical amplification which is doped into the amplification optical fiber 40 is pumped to cause population inversion. In this case, signal light input from the incident termination to one termination of the amplification optical fiber 40 via an optical circulator 10 and the optical multiplexing/demultiplexing unit 30 is amplified by stimulated emission of the active substance. The amplified signal light is reflected by the reflecting mirror 90 at the other termination of the amplification optical fiber 40 and output from one termination of the amplification optical fiber 40. The light signal is then output to the exit termination via the optical multiplexing/demultiplexing unit 30 and the optical circulator 10.

In this case, optical isolators 70 and 71 and the optical circulator 10 constitute a non-reciprocity circuit for restricting laser oscillation by suppressing reflection from the amplification optical fiber 40. An optical filter 80 serves to block noise light and pump light emerging from the amplification optical fiber 40 and transmit only signal light.

The optical fiber amplifier of the bidirectional pumping scheme is superior to the optical fiber amplifiers of the forward and backward pumping schemes in the gain, output, and noise index of signal light and the like. The optical fiber amplifier of the reflection pumping scheme is superior to that of the bidirectional pumping scheme in pumping efficiency.

The systems shown in FIG. 1 to 8, and 16 to 20, 21A, 21B, are superior to those shown in FIGS. 10 to 13. This will be described in detail below.

Figure 14A:
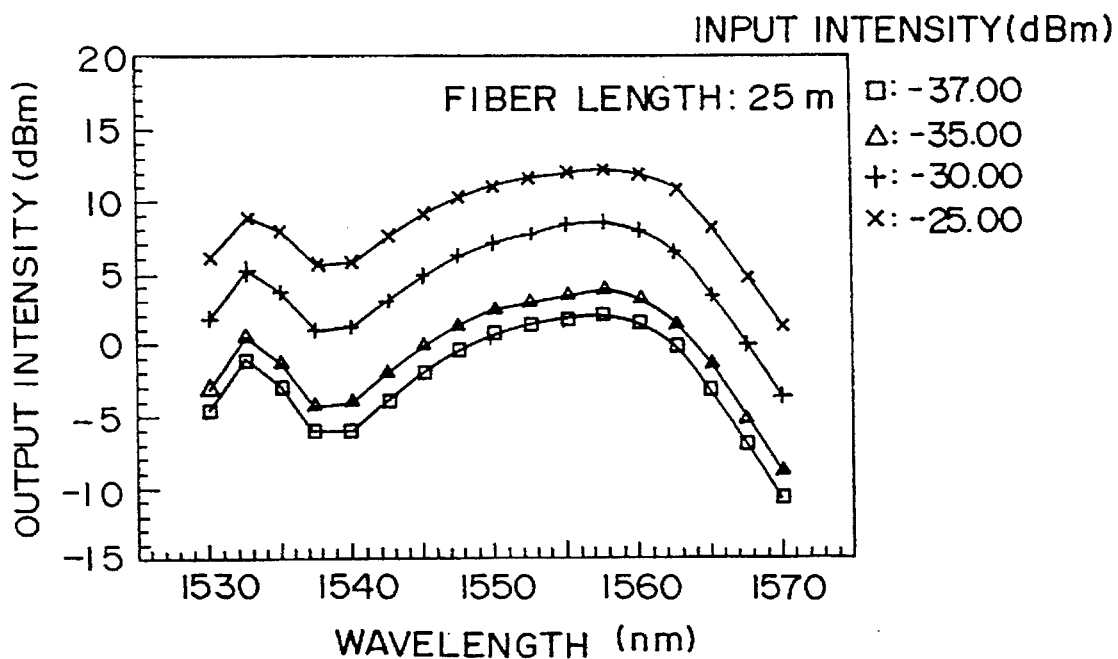
FIGS. 14A and 14B are graphs showing spectra indicating the signal light wavelength-output intensity characteristics of an optical fiber amplifier.
Figure 14B:
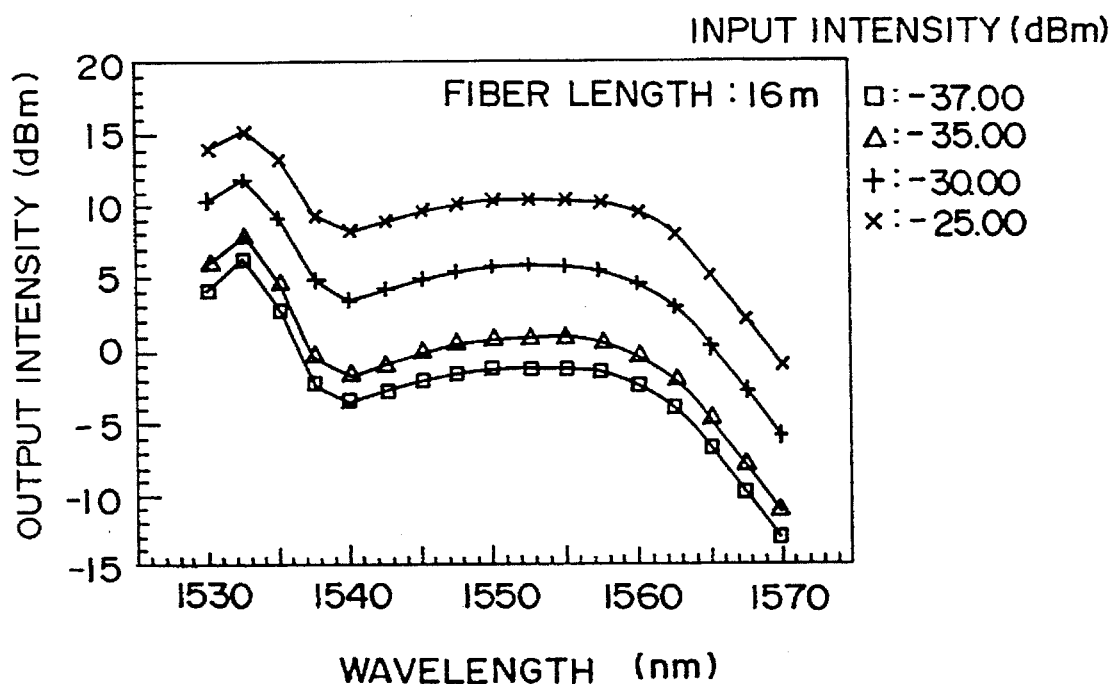

FIGS. 14A and 14B show the signal light wavelength-output intensity characteristics of the optical fiber amplifier in FIG. 13. The output intensity of signal light is measured with respect to the input intensity of the signal light which changes from −37.00 dBm to −35.00 dBm, −30.00 dBm, and −25.00 dBm, while the input intensity of pump light is kept constant. In this case, the fiber length in the axial direction of the amplification optical fiber is about 25 m in FIG. 14A, and about 16 m in FIG. 14B.

According to the spectra shown FIG. 14A, it is apparent that the optical amplification characteristics of an amplification fiber having a predetermined fiber length has a sufficiently high wavelength dependency.

In addition, amplification optical fibers having different fiber lengths exhibit different wavelength dependencies in their optical amplification characteristics. More specifically, the larger the fiber length of an optical fiber amplifier is, the larger the gain is proved with respect to signal light having a short wavelength. The smaller the fiber length of an optical fiber amplifier is, the larger the gain is provided with respect to signal light having a long wavelength. It is necessary that signal light have a sufficiently lower input intensity, and population inversion caused by an active substance in an amplification optical fiber be not in a saturated state.

Such optical amplification characteristics are based on the wavelength dependence at the absorption/stimulated emission sectional area of an active substance doped into a clad or core portion. Assume that the concentration of an active substance is kept constant in the axial direction. In this case, as the absorption/stimulated emission sectional area of the active substance increases with respect to signal light having a plurality of different wavelength components, the fiber length for providing a constant gain with respect to each wavelength component decreases. Therefore, when each of the optical fiber amplifiers shown in FIGS. 10 to 13 is to be applied to an optical communication system for performing wavelength division multiplex communication, the gain varies depending on the wavelength components of signal light. In order to obtain the maximum gain for each wavelength component of signal light, different fiber lengths must be set for the respective wavelength components.

Assume that Er is used as an active substance in an amplification optical fiber. In this case, even if a constant gain is to be guaranteed in a signal light wavelength region of 1.53 to 1.57 µm, the optimal fiber length of the amplification optical fiber which is set for a wavelength of 1.53 µm is too small for a wavelength of 1.57 µm. In contrast to this, the optimal fiber length of the amplification optical fiber which is set for a wavelength of 1.57 µm is too large for a wavelength of 1.53 µm. For this reason, some measures, e.g., increasing the input intensity of pump light, are further required.

The systems shown in FIG. 1 to 8, and 16 to 21B solve the above problems and reduce the variations in optical amplification characteristics with respect to signal light having a plurality of different wavelength components, thereby providing optical fiber amplifiers which can be suitably used in wavelength division multiplex communication.

Figure 15A:
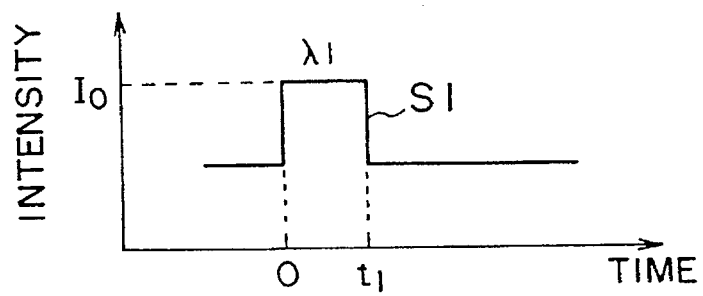
FIGS. 15A to 15H are graphs showing the waveforms.
Figure 15B:
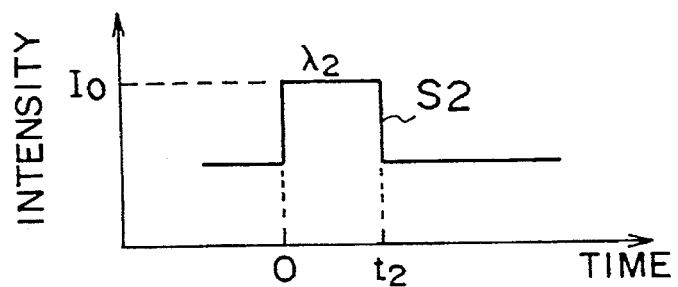

FIG. 1 shows a system according to the first embodiment of the present invention. FIG. 15A and FIG. 15B show light signals input to this system. The system is designed as an optical transmission system for amplifying signal light including the first light signal S1 having a first wavelength $\lambda_1$ and the second light signal S2 having a second wavelength $\lambda_2$. The first light signal S1 is a pulse wave having a rise time 0 and a fall time t1, as shown in FIG. 15A. The second light signal S2 is a pulse wave having a rise time 0 and a fall time t2, as shown in FIG. 15B.

The system shown in FIG. 1 comprises: (a) an optical circulator 10 to/from which signal light S is input/output; (b) a pump light source 20 for emitting pump light PU; (c) an optical multiplexing/demultiplexing unit 30 connected to the optical circulator 10 and the pump light source 20; (d) a first amplification fiber 40 connected to the optical multiplexing/demultiplexing unit 30 and containing an active substance for optical amplification; (e) a second amplification fiber 41 connected to the first amplification fiber 40 and containing an active substance for optical amplification; and (f) first reflector means (an optical fiber having grating therein) 50 for connecting the first and second amplification fibers 40 and 41, and including a first diffraction grating 100.

The optical circulator 10, preferably has first, second, and third ports P1, P2, and P3, for outputting the signal light S, input through the first port P1, from the second port P2, and outputting the signal light S, input through the second port P2, from the third port P3. The signal light S includes the first and second light signals S1 and S2.

The first amplification fiber 40 is connected to the second port P2 of the optical circulator 10 and amplifies the signal light S.1 The second amplification fiber 41 is connected to the first amplification fiber 40, and amplifies the signal light S passing through the first amplification fiber 41. The first reflector 50 is connected between the first and second amplification fibers 40 and 41 and reflects the first light signal S1, and transmitting the second light signal S2.

A second reflector 51 is connected to the second amplification fiber 41 such that the second amplification fiber 41 is arranged between the first and second reflectors 50 and 51 and selectively reflects the second light signal S2.

The first light signal S1 of the signal light S output from the second port P2 of the optical circulator 10, reciprocates in the first amplification fiber 40 to be amplified. The second light signal S2 of the signal light S output from the second port P2 of the optical circulator 10, reciprocates in the first and second amplification fibers 40 and 41 to be amplified.

Amplified light signals S1' and S2' (see FIG. 15E and FIG. 15F) are output from the third port P3 of the optical circulator 10. As shown in FIG. 15E and FIG. 15F, the first and second light signals S1 and S2 having different wavelengths are amplified at a uniform amplification factor $I_2$.

The system shown in FIG. 1 includes a reflectionless termination ET which does not reflect light input thereto and is connected to the second amplification fiber 41. The second amplification fiber 41 is arranged between the reflectionless termination ET and the first reflector 50. Therefore, undesirable light such as noise is not output from the third port P3 of the optical circulator 10, because the undesirable light is not reflected by the reflectionless termination ET.

The first and second amplification fibers 40 and 41 are Er-doped fibers. Each fiber is comprised of silica glass. The first reflector 50 is an optical fiber 50 having a first diffraction grating 100 formed therein. The first reflector means 50 may be a dielectric multilayer filter (dielectric multilayer reflecting mirror). The second reflector 51 is an optical fiber 51 having a second diffraction grating 101. The second reflector 51 may be a dielectric multilayer filter (dielectric multilayer reflecting mirror). The fiber diffraction gratings 50 and 51 may be made of Er-doped fibers or general Ge-doped fibers without containing Er. In general, general Ge-doped fibers include Ge in its core, and do not include dopant Er.

The signal light S input through an incident termination IT is amplified by the first and second amplification fibers 40 and 41 and output from an exit termination OT. Pumping in the respective amplification fibers 40 and 41 is performed by introducing the pump light PU into the fibers 40 and 41. The pump light PU is emitted from the pump light source 20. The pump light source 20 is a semiconductor laser diode 20 emitting pump light with wavelength $\lambda_0$.

The pump light PU is introduced into the first and second amplification fibers 40 and 41 via the optical multiplexing/demultiplexing unit (Wavelength Division Multiplexer, WDM) 30. The signal light S and the pump light PU are superposed on each other by the optical multiplexing/demultiplexing unit 30. Note that the pump light PU passing through the first and second amplification fibers 40, 41 is selectively reflected by a diffraction grating 102.

Next, the system shown in FIG. 1 is explained in more detail.

In this optical fiber amplifier, a main path is arranged, along which signal light S travels from the incident termination IT to the exit termination OT via the optical circulator 10. An amplification path is connected to the second port P2 of the optical circulator 10. Along the amplification path, signal light S sequentially passes through a connecting fiber F3, the optical multiplexing/demultiplexing unit 30, the first amplification optical fiber 40, the first grating fiber 50, the second amplification optical fiber 41, and the second grating fiber 51, and returns to pass through these components again in the reverse order.

In addition, a branch path BR is connected to the optical multiplexing/demultiplexing unit 30. Along this path BR, pump light PU from the pump light source 20 reaches the amplification path.

The optical circulator 10 is a three-terminal optical circulator whose plane of deflection is formed by a rotating Faraday element or the like. The optical circulator 10 outputs wavelength-division-multiplexed signal light S from the incident termination to the optical multiplexing/ demultiplexing unit 30, and also outputs signal light from the optical multiplexing/demultiplexing unit 30 to the exit termination OT. The pump light source 20 is a light-emitting element such as a laser diode (LD), which generates pump light and outputs it to the optical multiplexing/demultiplexing unit 30. Note that signal light S has wavelength components $\lambda_1$ and $\lambda_2$ with an input intensity $P_S$, and pump light has a wavelength component $\lambda_0$ with an input intensity $P_E$.

The optical multiplexing/demultiplexing unit 30 is a directional coupling type wavelength division multiplex (WDM) fiber coupler 30. The optical multiplexing/demultiplexing unit 30 multiplexes signal light S from the optical circulator 10 with pump light from the pump light source 20 and outputs the resultant light to the amplification optical fiber 40. The optical multiplexing/demultiplexing unit 30 also outputs signal light S from the amplification optical fiber 40 to the optical circulator 10 upon demultiplexing the signal light from pump light PU.

Each of the amplification optical fibers 40 and 41 is an Er-doped optical fiber obtained by doping a small amount of Er, as an active substrate for optical amplification, into mainly the core portion.

The optical fibers 50 and 51 having diffraction gratings therein are general glass optical fibers, each having the same refractive index distribution as that of an optical fiber connected to its termination portion and allowing easy formation of a diffraction grating by doping a large amount of Ge or the like. The first diffraction grating 100 is formed in the transmission optical fiber 50, whereas the diffraction gratings 101 and 102 are formed in the diffraction grating write optical fiber 51. Note that each of the diffraction gratings 100 to 102 is an optical fiber grating having a refractive index change pattern formed in the clad or core portion by irradiating interference fringes formed by ultraviolet rays from an Ar laser or the like according to a general holographic method or phase grating method.

These diffraction gratings 100, 101 and 102 respectively reflect the first light signal S1 having a reflection wavelength region $\lambda_{R1}$ with a central wavelength $\lambda_1$, the second light signal S2 having a reflection wavelength region $\lambda_{R2}$ with a central wavelength $\lambda_2$, and the pump light PU having a reflection wavelength region $\lambda_{R0}$ with a central wavelength $\mu_0$ at a sufficiently large suppression ratio.

The amplification optical fiber 40 amplifies signal light S from the opticamultiplexing/ demultiplexing unit 30 by stimulated emission of Er pumped by pump light from the optical multiplexing/ demultiplexing unit 30, and outputs the amplified signal light S to the diffraction grating fiber 50. The optical multiplexing/demultiplexing unit 30 also amplifies signal light S from the diffraction grating optical fiber 50 and outputs the amplified signal light S to the optical multiplexing/demultiplexing unit 30.

The diffraction grating optical fiber 50 causes the first diffraction grating 100 to reflect the wavelength component $\lambda_1$ of the signal light from the amplification optical fiber 40, and outputs the wavelength component to the amplification optical fiber 40. In addition, the diffraction grating write optical fiber 50 transmits the signal light S containing other wavelength components and outputs it to the amplification optical fiber 41.

The amplification optical fiber 41 amplifies the signal light S from the diffraction grating optical fiber 50 by stimulated emission of Er pumped by the pump light from the diffraction grating optical fiber 50, and outputs the amplified signal light to the grating fiber 51. In addition, the second amplification optical fiber 41 amplifies signal light S from the diffraction grating write optical fiber 51 and outputs the amplified signal light S to the grating fiber 50. The second grating fiber 51 causes the diffraction grating 101 to reflect the wavelength component $\lambda_2$ of the signal light S from the amplification optical fiber 41 and outputs it to the amplification optical fiber 41. The diffraction grating optical fiber 53 causes the diffraction grating 102 to reflect the pump light PU from the amplification optical fiber 41, and outputs it to the amplification optical fiber 41. The grating fiber 53 also transmits the light containing other wavelength components and outputs it to the open termination.

In this case, fiber lengths $L(\lambda_1)$ and $L(\lambda_2)$ of the amplification optical fibers 40 and 41 through which the wavelength components $\lambda_1$ and $\lambda_2$ of signal light pass are set on the basis of the absorption/stimulated emission sectional area of Er as an active substance with respect to the wavelengths $\lambda_1$ and $\lambda_2$, in consideration of the intensity of pump light, the concentration distribution of the active substance, and other fiber structures.

Figure 2A:
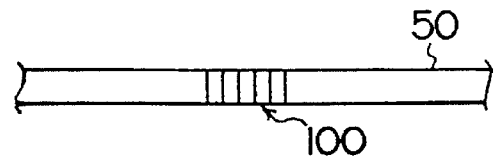
FIGS. 2A to 2C respectively show the arrangements of devices which can replace an optical fiber grating in the first embodiment.
Figure 2B:
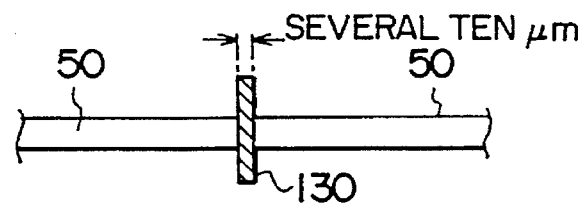
Figure 2C:
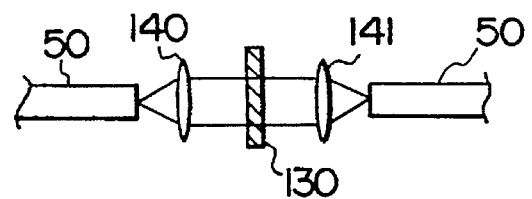
Figure 3:
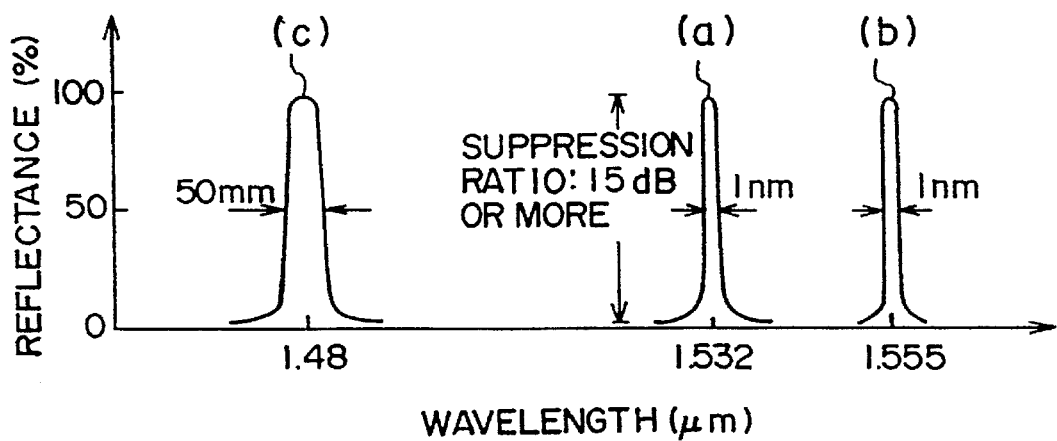
FIG. 3 is a graph showing spectra indicating the wavelength-reflectance characteristics of the optical fiber grating in the first embodiment.

FIG. 2A shows the arrangement of the diffraction grating 100 as a representative of the diffraction gratings 100 to 102. FIGS. 2B and 2C respectively show the arrangements of devices which can replace the diffraction grating 100. The diffraction grating 100 as a device for reflecting a wavelength component of signal light is formed in the grating fiber 50. In place of this diffraction grating 100, a dielectric multilayer filter 130 having a thickness of several ten μm and the same reflection wavelength as that of the diffraction grating 100 may be inserted to be perpendicular to the optical axis of the fiber 50.

In addition, collimator lenses 140 and 141 may be respectively arranged on the incident and exit sides of the dielectric multilayer filter 130. Such replacement is effective for the diffraction gratings 101 and 102 as well.

The function of the first embodiment will be described next.

Pump light PU emitted from the pump light source 20 sequentially passes through the optical multiplexing/demultiplexing unit 30, the first amplification optical fiber 40, the first grating fiber 50, the second amplification optical fiber 41, and the second grating fiber 51. The pump light PU reflected by the diffraction grating 102 in the grating fiber 51 passes through the second amplification optical fiber 41, the grating fiber 50, the amplification optical fiber 40, and the optical multiplexing/demultiplexing unit 30 again in the opposite direction. As a result, Er doped, as an active substance for optical amplification, into the core portions of the amplification optical fibers 40 and 41 is pumped to cause population inversion.

In this case, the wavelength-division-multiplexed signal light S input from the incident termination IT to the optical circulator 10 is output to the amplification optical fiber 40 via the optical multiplexing/demultiplexing unit 30. The wavelength component $\lambda_1$ of the sign light S is amplified by stimulated emission of Er as an active substance in the first amplification optical fiber 40. The amplified light S is reflected by the diffraction grating 100 in the first grating fiber 50. As a result, the wavelength component $\lambda_1$ of the signal light S is amplified again in the amplification optical fiber 40 and output to the optical multiplexing/demultiplexing unit 30. The wavelength component $\lambda_2$ of the signal light S is amplified by stimulated emission of Er as an active substance in the amplification optical fiber 40, and is also amplified in the amplification optical fiber 41 via the grating fiber 51 in the same manner as described above.

The light with amplified wavelength component is then reflected by the diffraction grating 101 in the second grating fiber 51. As a result, the wavelength component $\lambda_2$ for the signal light S is amplified again by the amplification optical fibers 40 and 41 and output to the optical multiplexing/demultiplexing unit 30.

The wavelength components $\lambda_1$ and $\lambda_2$ of the signal light, which have returned to the optical multiplexing/demultiplexing unit 30 in the above manner, are output to the exit termination via the optical circulator 10. Meanwhile, wavelength components other than wavelength components $\lambda_1$ and $\lambda_2$ of the signal light sequentially pass through the amplification optical fiber 40, the grating fiber 50, the amplification fiber 41, and the grating fiber 51 to be output to the reflectionless termination.

Since the fiber length $L(\lambda_1)$ of the first amplification optical fiber 40 through which the wavelength components $\lambda_1$, and the fiber length $L(\lambda_2)$ of the second amplification optical fiber 41 through which the wavelength components $\lambda_2$ of the signal light pass are set on the basis of the absorption/stimulated emission sectional area of the active substance with respect to the wavelengths $\lambda_1$ and $\lambda_2$, each of the wavelength components $\lambda_1$ and $\lambda_2$ of the signal light S is amplified to obtain a predetermined gain. If, for example, these two fiber lengths are set to be the optimal values for optical amplification characteristics based on the input intensity of pump light with respect to the wavelengths $\lambda_1$ and $\lambda_2$, gains $G(\lambda_1)$ and $G(\lambda_2)$ of the wavelength components $\lambda_1$ and $\lambda_2$ of the signal light are maximized. In addition, if the two fiber lengths are respectively set to be large with respect to one of the wavelengths $\lambda_1$ and $\lambda_2$ which has a smaller gain and small with respect to the other wavelength which has a larger gain in optical amplification characteristics based on the intensity of pump light, the gains $G(\lambda_1)$ and $G(\lambda_2)$ of the wavelength components $\lambda_1$ and $\lambda_2$ of the signal light are made equal to each other.

Since pump light PU is reflected by the diffraction grating 102 in the diffraction grating fiber 51, no pump light PU is wastefully output from the open termination ET. Therefore, the active substance in each optical amplification fiber can be effectively pumped. On the other hand, since natural exit light other than signal light S and pump light PU is output from the reflectionless termination ET, undesirable amplification of noise light can be minimized.

An experimental example of the first embodiment will be described next.

In the optical fiber amplifier of the first embodiment described above, two-wavelength light signals S1, S2 were input-as signal light S, and the gain of each wavelength component of the signal light S was measured. In this experiment, measurement conditions were set as follows:

wavelength of pump light:
$\lambda_0$=1.48 μm input intensity of pump light:
$P_E$=120 mW wavelengths of signal light: $\lambda_1$=1.53 μm
$\lambda_2$=1.55 μm input intensity of signal light:
$P_S$=−25 dBm amplification optical fiber lengths:

$L(\lambda_1)$=16 m
$L(\lambda_2)$=22 m reflection wavelength regions of diffraction gratings:
$\lambda_{R0}$=1.48 μm±25 nm
$\lambda_{R1}$=1.532 μm±0.5 nm
$\lambda_{R2}$=1.555 μm±0.5 nm Note that In FIG. 3, (a), (b) and (c) respectively show the wavelength-reflectance characteristics of the diffraction gratings 100 to 102. In each of the diffraction gratings 100 to 102, the reflectance with respect to the central wavelength was about 100%, and the suppression ratio of the wavelength-reflectance characteristics was 15 dB or more.

The following is the measurement result:

gains of signal light: $G(\lambda_1)$ and $G(\lambda_2)$=35 dB
It is, therefore, apparent that the wavelength components $\lambda_1$ and $\lambda_1$ of the signal light were amplified to have the same gain.

Figure 16:
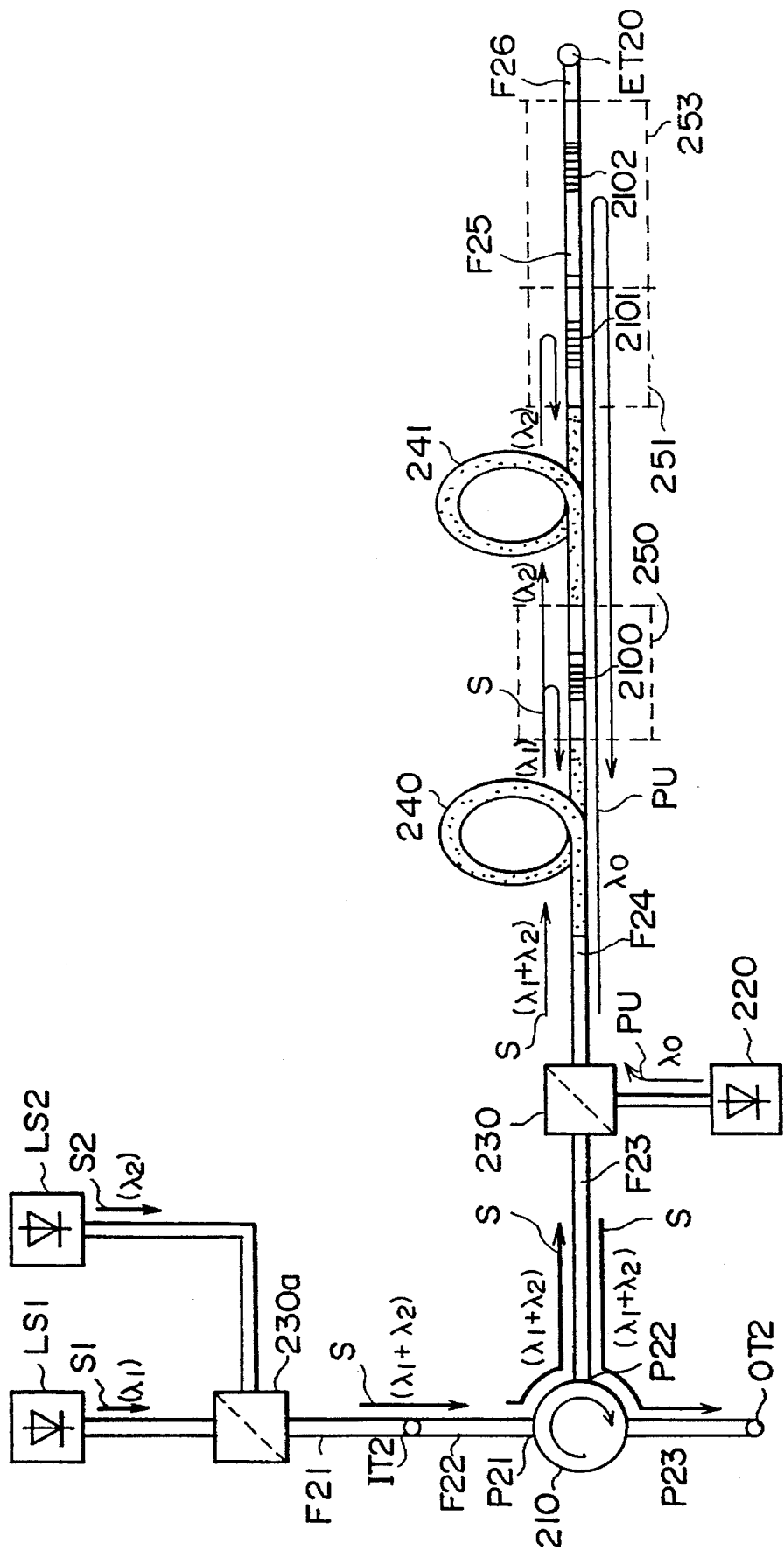
FIG. 16 shows the optical transmission system including two light sources respectively outputting first and second light signals.

FIG. 16 shows the system relating to FIG. 1. The system further comprises a first light source LS1, a second light source LS2, and a second wavelength division multiplexer 230a. The first light source LS1 is a laser diode LS1, and the first light source outputs the first light signal S1. The second light source LS2, is a laser diode LS2, and the second light source outputs the second light signal S2. The first light signal S1 includes the first wavelength $\lambda_1$, and the second light signal S2 includes the second wavelength $\lambda_2$.

These light signals S1 and S2 are multiplexed with the second multiplexer 230a, and the signal light S including these light signals S1 and S2 is introduced into a first optical circulator 210 through a fiber F21, an Input terminal IT2, a fiber F22 and a first port P21 of the first circulator 210. The signal light S input through the first port P21 is output through a second port P22, and travels through the fiber F23 which connects the optical circulator 210 to a first wavelength division multiplexer (WDM) 230.

The signal light S and pumping light PU are multiplexed with the first multiplexer 230. The first wavelength division multiplexer 230 and a first optical amplification fiber 240 are connected through an ordinary fiber F24. The ordinary fiber F24 does not includes active dopant such as Er. The Er doped fiber 240 is more expensive than the ordinary fiber. Accordingly, this system having the ordinary fiber F24 arranged between the optical component 230 and Er doped fiber 240 is superior to a system which does not have this.

In FIG. 16, the first amplification fiber 240 and a second amplification fiber(second amplification means) 241 are connected through a first reflector 250. The first reflector (first reflecting fiber) 250 has a first grating region 2100 formed therein. The second amplification fiber 241 is arranged such that the second amplification fiber 241 is located between the first reflecting fiber 250 and a second reflecting fiber 251. The second reflecting fiber 251 has a second grating region 2101 formed therein. A third grating fiber 253 which reflects the pump signal PU is arranged between the second grating fiber 251 and a fiber F26 connected to a reflectionless termination ET20.

The grating fibers 250, 251, 253 are ordinary fibers having no active dopant such as Er. The grating fibers 250, 251, 253 include dopant such as Ge in their cores, for changing the index of the fibers. The dopant Ge is doped in the fiber for increasing its index. The second reflecting fiber 251 and the third reflecting fiber 253 are connected through a fiber F25. In FIG. 16, the fibers F24, 240, 250, 241, 251, F25, 253, F26 are spliced by fusing the ends of them.

The first light signal Sand second light signal S2 is introduced into the first amplification fiber 240. Then, the first-light signal S1 is selectively reflected by the grating 2100, and the second light signal S2 travels through the grating 2100. The second light signal is amplified in the second amplification fiber 241, and then is reflected by the second grating 2101. The pump light PU output from the light source 220 and the signal light S is multiplexed with the multiplexer 230. The pump light travels through the gratings 2100, 2101, and is reflected by the grating 2102. Noise light is introduced into the reflectionless termination ET20 through the fibers 253 and F26. The amplified signal light S is output from the output terminal OT2.

Figure 17:
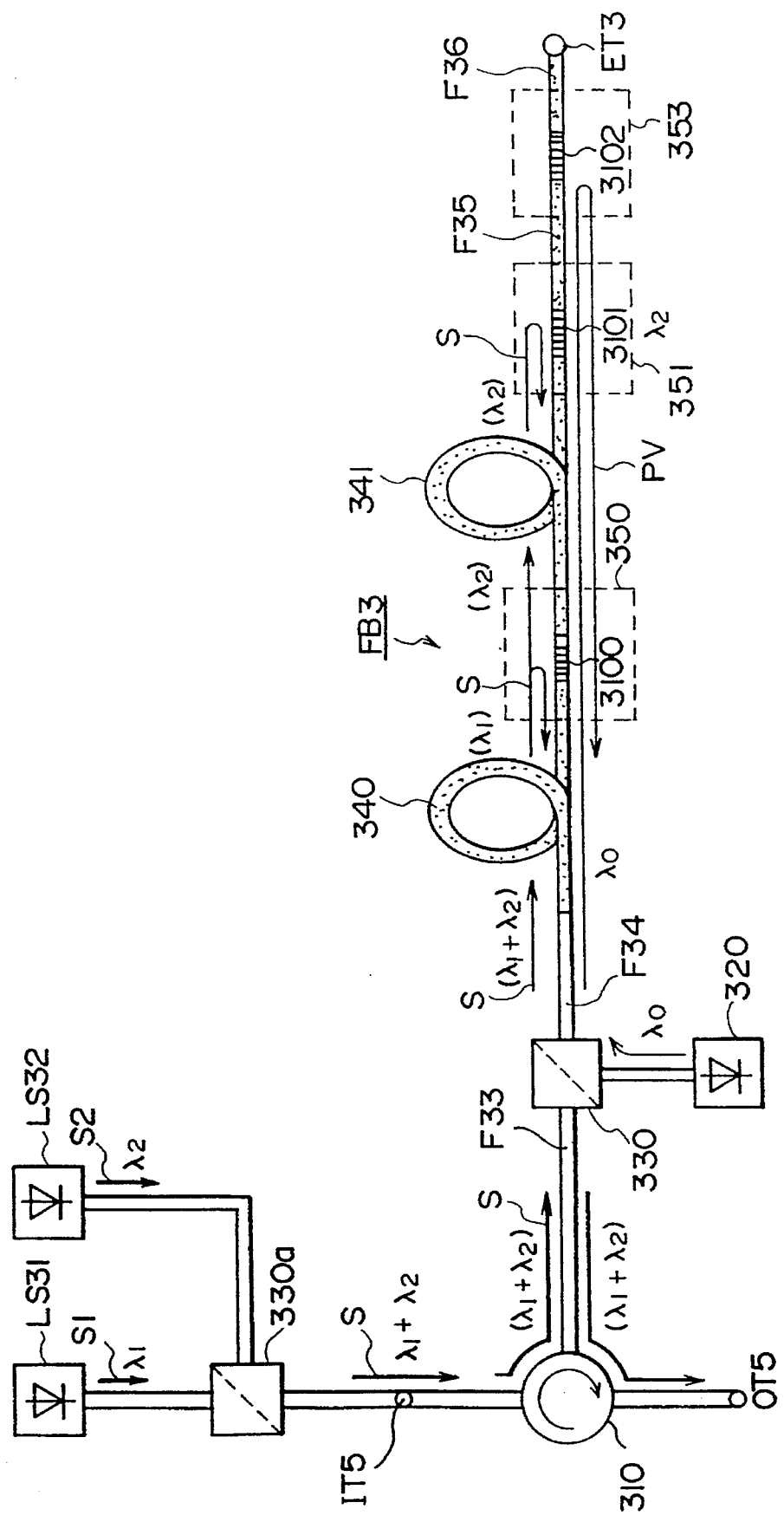
FIG. 17 shows the optical transmission system relating to FIG. 16, using a continuous Er doped fiber, wherein the first and second amplification fibers, and the first and second reflector are formed from an Er doped fiber.

FIG. 17 shows a system having an ordinary fiber F34 and an Er doped amplification fiber FB3 connected to the ordinary fiber F34. There in no joint in the amplification fiber FB3. The amplification fiber FB3 has a first and second amplification fibers 340, 341, and a first, second and third reflecting fibers 350, 351, 353, an Er doped fiber F35. Accordingly, there is no joint between the fibers 340, 341, 350, 351, 353, F35.

However, the fiber FB3 includes the first amplification fiber 340 for amplifying light passing therethrough the second amplification fiber 341 for amplifying light passing therethrough the first reflector 350 for selectively reflecting the first light signal S1, and transmitting the second light signal S2, the first reflector 350 connecting the first amplification means 340 to the second amplification fiber 341, and the second reflector 351 for selectively reflecting the second light signal S2. The pump light reflector 353 selectively reflects the pump light PU input thereto. This system has ordinary fiber F34 connected to the reflecting fiber F36 and a reflectionless termination ET36 connected to the fiber F36.

The first light signals S1 is output from the first light source LS31, and the second light signal S2 is output from the second light source LS32. These signals S1, S2 are multiplexed with a second multiplexer 330a, and introduced into the first optical circulator 310 via an input termination IT5. The introduced signals S1, S2 are output into a ordinary fiber F33 and amplified by passing through the amplification fiber FB3. The amplified light signals S1, S2 are output to the output termination OT5 via the optical circulator 310.

The amplification fiber FB3 is formed by a method including the steps of; forming one Er doped fiber and forming the first grating region 3100, second grating region 3101 and third grating region 3102 in the Er doped fiber.

Figure 4:
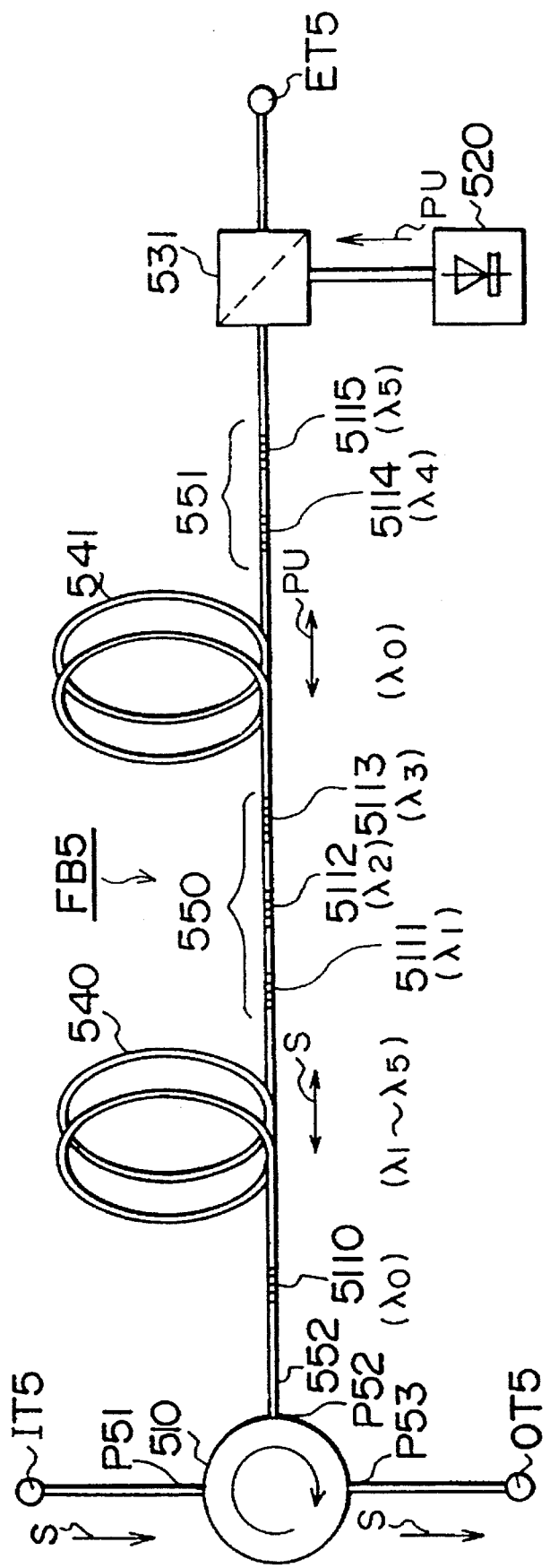
FIG. 4 is a view showing the arrangement of an optical fiber amplifier according to the second embodiment of the present invention.

FIG. 4 is a view showing a system according to the second embodiment. FIG. 1 shows a forward pumping type optical amplification system. FIG. 4 shows a backward pumping type optical amplification system. The system shown in FIG. 4 includes an amplification optical fiber FB5 obtained by manufacturing an amplification fibers 540 and 541 and reflectors 550 and 551. The fiber FB5 is an erbium-doped fiber. That is, the reflector 550 includes a fiber 550 doped with an active substance such as erbium (Er). The reflector 550 includes diffraction gratings 5111, 5112, and 5113. The reflector 551 includes a fiber doped with an active substance such as Er. The reflecting means 551 includes diffraction gratings 5114 and 5115. Pump light PU is introduced into the amplification fiber FB5 via an optical multiplexing/demultiplexing unit (WDM) 531. The pump light PU is then reflected by the diffraction grating 5110 toward the WDM 531. The reflected pump light PU is absorbed by a reflectionless termination ET5.

When the signal light S shown in FIG. 15A and FIG. 15B is input to the systems through the input termination IT or IT5, the signal light S shown in FIG. 15E and 15F (including the light signals S1' and S2') is output. These amplified light signals S1' and S2' have the substantially same intensity I2. The maximum intensity of light signal S1' is higher than 90% of the maximum intensity of the light signal S2' and lower than 110% thereof.

Figure 15C:
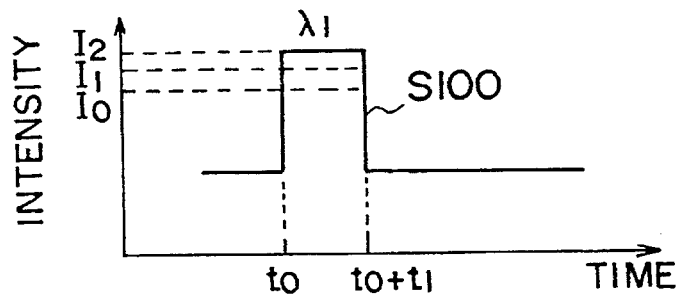
Figure 15D:
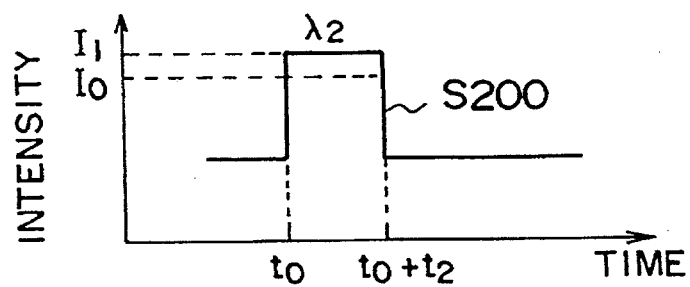
Figure 15E:
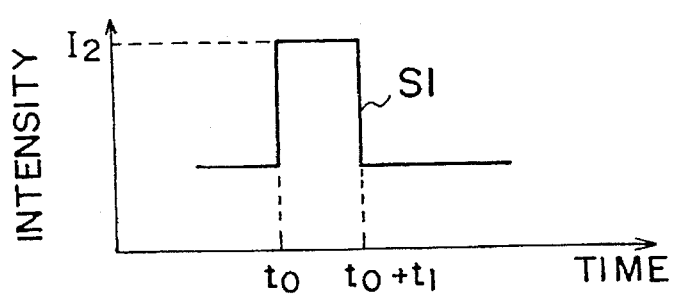
Figure 15F:
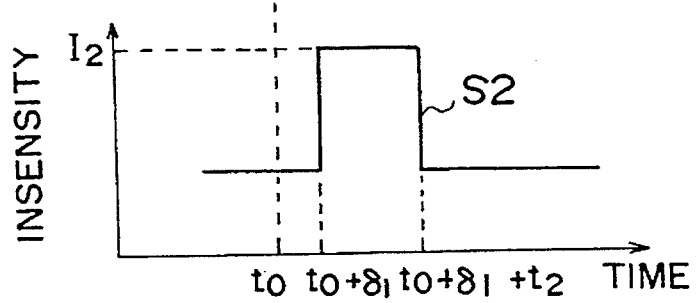

FIG. 15C and 15D show output waveforms obtained when the signal light S shown in FIG. 15A and 15B is input to the system shown in FIG. 13 as a comparative example. In the system shown FIG. 13, the amplification factors of amplified light signals S100 and S200 are different from each other. The maximum intensity of the amplified light signal S100 is an intensity I2, but the maximum intensity of the amplified light signal S200 is an intensity I1 which is smaller than the intensity I2. As described above, the systems shown in FIGS. 1 and 4 are advantageous over the system shown in FIG. 13 in terms of uniformity of amplification factors.

Next, the system shown in FIG. 4 is explained in more detail.

In this optical fiber amplifier, a main path is arranged, along which signal light travels from an incident termination IT5 to the exit termination OT5 via the optical circulator 510 which has a first port P51, a second port P52 and a third port P53. An amplification path is connected to the optical circulator 510. Along the amplification path, signal light sequentially passes through a diffraction grating write optical fiber 552, the amplification optical fiber 542, and the optical multiplexing/demultiplexing unit 531, and returns to pass through these components again in the reverse order. In addition, a branch path is connected to the optical multiplexing/demultiplexing unit 531. Along this path, pump light from the pump light source 520 reaches the amplification path.

The optical circulator 510 is a three-terminal optical circulator whose plane of deflection is constituted by a rotating Faraday element and the like. The optical circulator 510 outputs wavelength-division-multiplexed signal light S from the incident termination to the diffraction grating write optical fiber 552, and also outputs pump light from the diffraction grating write optical fiber 552 to the exit termination. The pump light source 520 is a light-emitting element such as an LD. The pump light source 520 generates pump light and outputs it to the optical multiplexing/demultiplexing unit 531. Note that the signal light has wavelength components $\lambda_1$ to $\lambda_5$ with an input intensity $P_E$.

The diffraction grating write optical fiber 552 is an optical fiber having the same refractive index distribution as that of an optical fiber connected its termination portion, and allows easy formation of a diffraction grating by doping a large amount of Ge or the like. The amplification optical fiber 542 is an Er-doped quartz optical fiber obtained by doping a small amount of Er, as an active substance for optical amplification, into mainly the core portion. A diffraction grating 5110 is formed in the grating fiber 552, whereas diffraction gratings 5111 to 5115 are formed in the amplification optical fiber 542.

Note that each of the diffraction gratings 5110 to 5115 is an optical fiber grating having a refractive index change pattern formed in the clad or core portion by irradiating interference fringes formed by ultraviolet rays from an Ar laser or the like according to a general holographic method or phase grating method. These diffraction gratings 5110 to 5115 respectively have reflection wavelength regions $\lambda_{Ri}$ with central wavelengths $\lambda_i$; at a sufficiently large suppression ratio. In this case, i=0, 1, . . . , 5.

The diffraction grating write optical fiber 552 transmits signal light from the optical circulator 510 to output it to the amplification optical fiber 542, and transmits signal light from the amplification optical fiber 542 to output it to the optical circulator 510. In addition, the diffraction grating write optical fiber 552 causes the diffraction grating 5110 to reflect pump light PU from the amplification optical fiber FB5, and outputs it to the amplification optical fiber FB5. The amplification optical fiber 542 amplifies the signal light from the diffraction grating write optical fiber 552 by stimulated emission of radiation from Er pumped by pump light PU from the optical multiplexing/demultiplexing unit 531. The amplification optical fiber FB5 then causes the diffraction gratings 5111 to 5115 to respectively reflect the wavelength components $\lambda_1$ to $\lambda_5$ of the signal light to amplify the wavelength components, and outputs them to the grating fiber 552. In addition, the amplification optical fiber FB5 transmits signal light containing other wavelength components and outputs it to the optical multiplexing/demultiplexing unit 531.

The optical multiplexing/demultiplexing unit 531 is a directional coupling type WDM fiber coupler, which outputs pump light PU from the pump light source 520 to the amplification optical fiber FB5, and outputs signal light S from the amplification optical fiber FB5 to the reflectionless termination ET5.

Fiber lengths $L(\lambda_1)$ to $L(\lambda_5)$ of the portions 5111, 5112, 5113, 5114, 5115 of the amplification optical fiber FB5 through which the wavelength components $\lambda_1$ to $\lambda_5$ of the signal light S respectively pass are set on the basis of the absorption/stimulated emission sectional area of Er as an active substance with respect to the wavelengths $\lambda_1$ to $\lambda_5$, in consideration of the intensity of pump light PU, the concentration distribution of the active substance, and other fiber structures.

Note that the diffraction gratings 5110 to 5115 are formed in the grating fiber 552 and the amplification optical fiber FB5. In place of these diffraction gratings 5110 to 5115, dielectric film filters having a thickness of several ten μm and the same reflection wavelengths as those of the diffraction gratings may be inserted to be perpendicular to the optical axis.

The function of the second embodiment will be described next.

Pump light PU emitted from the pump light source 520 sequentially passes through the optical multiplexing/demultiplexing unit 531, the amplification optical fiber FB5, and the grating fiber 552. The pump light PU reflected by the diffraction grating 5110 in the grating fiber 552 passes through the amplification optical fiber FB5 and the optical multiplexing/demultiplexing unit 531 again in the opposite direction. As a result, Er doped, as an active substance for optical amplification, into the core portion of the amplification optical fiber FB5 is pumped to cause population inversion.

In this case, wavelength-division-multiplexed signal light input from the incident termination to the optical circulator 510 is output to the amplification optical fiber FB5 via the grating fiber 552. In the amplification optical fiber FB5, the wavelength components $\lambda_1$ to $\lambda_5$ of the signal light are amplified by stimulated emission of emission from Er as an active substance and are respectively reflected by the diffraction gratings 5111 to 5115. As a result, the wavelength components $\lambda_1$ to $\lambda_5$ of the signal light are amplified again and output to the diffraction grating write optical fiber 552.

The wavelength components $\lambda_1$ to $\lambda_5$ of the signal light, which have returned to the diffraction grating write optical fiber 552 in the above manner, are output to the exit termination via the optical circulator 510. Meanwhile, wavelength components other than the wavelength components $\lambda_1$ to $\lambda_5$ sequentially pass through the diffraction grating write optical fiber 552, the amplification optical fiber FB5, and the optical multiplexing/demultiplexing unit 531 and are output to the reflectionless termination ET5.

Since the fiber lengths $L(\lambda_1)$ to $L(\lambda_5)$ of the portions of the amplification optical fiber FB5 through which the wavelength components $\lambda_1$ to $\lambda_5$ of the signal light respectively pass are set on the basis of the absorption/stimulated emission sectional area of the active substance with respect to the wavelengths $\lambda_1$ to $\lambda_5$, each of the wavelength components $\lambda_1$ to $\lambda_5$ of the signal light is amplified to obtain a predetermined gain. If, for example, these five fiber lengths are set to be the optimal values for optical amplification characteristics based on the input intensity of pump light with respect to the wavelengths $\lambda_1$ to $\lambda_5$, gains $G(\lambda_1)$ to $G(\lambda_5)$ of the wavelength components $\lambda_1$ to $\lambda_5$ of the signal light are maximized.

In addition, if these five fiber lengths are set in the order of increasing magnitude with respect to the wavelengths $\lambda_1$ to $\lambda_5$ having gains arranged in the order of decreasing magnitude in the optical amplification characteristics based on the intensity of pump light, the gains $G(\lambda_1)$ to $G(\lambda_5)$ of the wavelength components $\lambda_1$ to $\lambda_5$ of the signal light are made equal to each other.

Since pump light PU is reflected by the diffraction grating 5110 in the grating write fiber 552, no pump light PU leaks to the output termination OT5 via the optical circulator 510. Therefore, the active substance in each optical amplification fiber can be effectively pumped.

An experimental example of the second embodiment will be described next.

In the optical fiber amplifier of the second embodiment described above, five-wavelength light was input as signal light, and the gain of each wavelength component of the signal light was measured. In this experiment, measurement conditions were set as follows:

wavelength of pump light:
  $\lambda_0$=1.48 μm input intensity of pump light:
  $P_E$=100 mW wavelengths of signal light:
  $\lambda_1$=1.532 μm
  $\lambda_2$=1.530 μm
  $\lambda_3$=1.535 μm
  $\lambda_4$=1.555 μm
  $\lambda_5$=1.545 μm input intensity of signal light:
  $P_S$=−25 dBm reflection wavelength regions of diffraction gratings:
  $\lambda_{R0}$=1.48 μm±25 nm
  $\lambda_{R1}$=1.532 μm±0.5 nm
  $\lambda_{R2}$=1.530 μm±0.5 nm
  $\lambda_{R3}$=1.353 μm±0.5 nm
  $\lambda_{R4}$=1.555 μm±0.5 nm
  $\lambda_{R5}$=1.545 μm±0.5 nm A fiber length $L(\lambda_i)$ of the amplification optical fiber through which each of the wavelength components $\lambda_1$ to $\lambda_5$ of the signal light passes was set such that a product $\alpha(\lambda_i) \times L(\lambda_i)$ of the fiber length $L(\lambda_i)$ and an absorption loss $\alpha(\lambda_i)$ per unit length which was caused by Er became 40 dB. In this case, i=1, 2, . . , 5.

Figure 5:
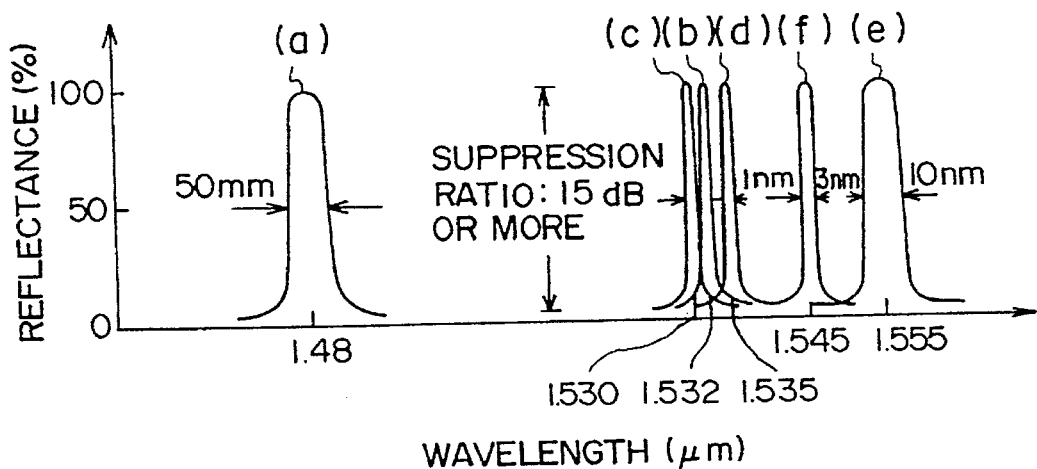
FIG. 5 is a graph showing spectra indicating the wavelength-reflectance characteristics of an optical fiber grating in the second embodiment.

In FIG. 5 (A) to (f) respectively show the wavelength-reflectance characteristics of the diffraction gratings 5110 to 5115. In each of the diffraction gratings 5110 to 5115, the reflectance with respect to the central wavelength was about 100%, and the suppression ratio of the wavelength-reflectance characteristics was 15 dB or more.

The following is the measurement result:

gains of signal light: G($\lambda_1$) to G($\lambda_5$)=35 dB±1dB

It is, therefore, apparent that the wavelength components $\lambda_1$ to $\lambda_5$ of the signal light were amplified to have the same gain.

Figure 6A:
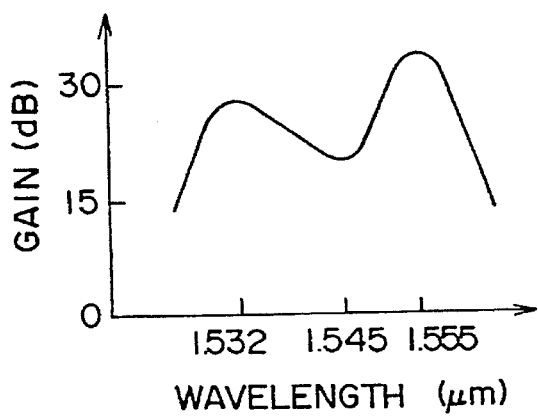
FIGS. 6A and 6B are graphs showing spectra indicating the signal light wavelength-gain characteristics of an optical fiber amplifier of the second embodiment and a conventional optical fiber amplifier.
Figure 6B:
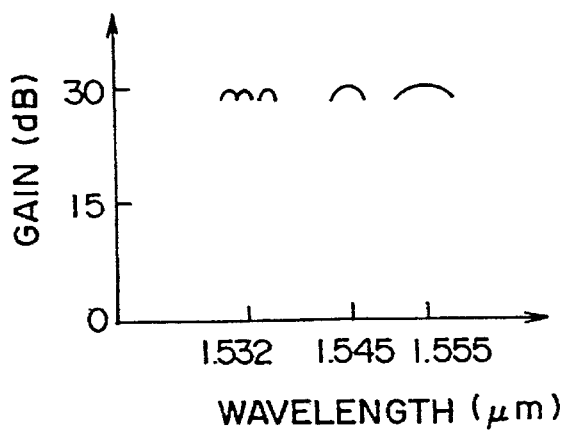

FIG. 6A shows the signal light wavelength-gain characteristics of a comparative optical fiber amplifier of the reflection pumping scheme, shown in FIG. 13. FIG. 6B shows the signal light wavelength-gain characteristics of the second embodiment. As compared with the prior art, it is apparent that the wavelength-gain characteristics obtained by the second embodiment exhibit an almost flat distribution even though they are discrete characteristics.

Although the systems shown in FIGS. 1, 16, 17 and 4 are excellent systems, there is room for improvement in the systems. Since the first and second amplified light signals S1' and S2' travel different distances when they pass through the amplification fibers 40 and 41, a time difference δ1 occurs between these amplified light signals S1' and S2' (see FIG. 15E and 15F). The system shown in FIG. 7 includes an amplification fiber FB6 which is connected to a first circulator 610 via a grating fiber 653 having a grating 6120 therein, and a compensation optical fiber 660 for compensating for this time difference δ1.

This system includes a second optical circulator 611 having a first port P610, a second port P620 and a third ports P630. The light signal S input through the first port P610 of the second optical circulator 611 is output from the second port P620 of the second optical circulator 611. The light signal S input through the second port P620 of the second optical circulator 611 is output from the third port P630 of the second optical circulator 611. The first port P610 of the second optical circulator 611 is connected to the third port P63 of the first optical circulator 610. The first optical circulator has a first port P61 through which the signal light S is input, a second port P62 for outputting the signal light S input through the first port P61, and a third port P63 for outputting the signal light S input through the second port P62.

The compensation optical fiber 660 is connected to the second port P620 of the second optical circulator 611. The compensation optical fiber 660 compensates for the time difference δ1 between first and second light signals S1' and S2' which is caused when they pass through a fiber amplifier FB6.

Figure 15G:
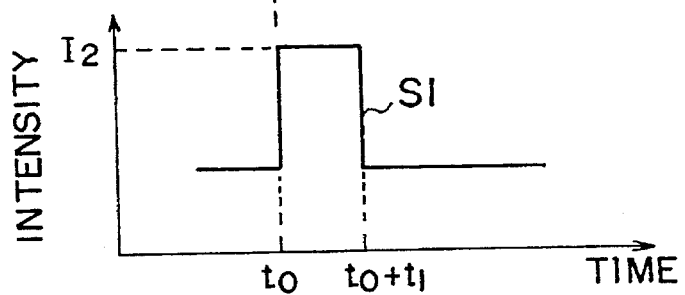
Figure 15H:
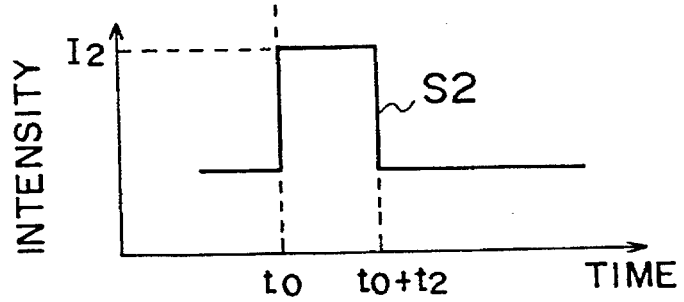

The compensation optical fiber 660 includes a plurality of diffraction gratings 6125, 6126, 6127, and 6128. This system also includes a reflectionless termination ET62 which is arranged at an end of the compensation fiber 660. FIG. 15G and 15H show an output from the system shown in FIG. 7. The time difference δ1 between amplified light signals S1 and S2 is 0.

Figure 7:
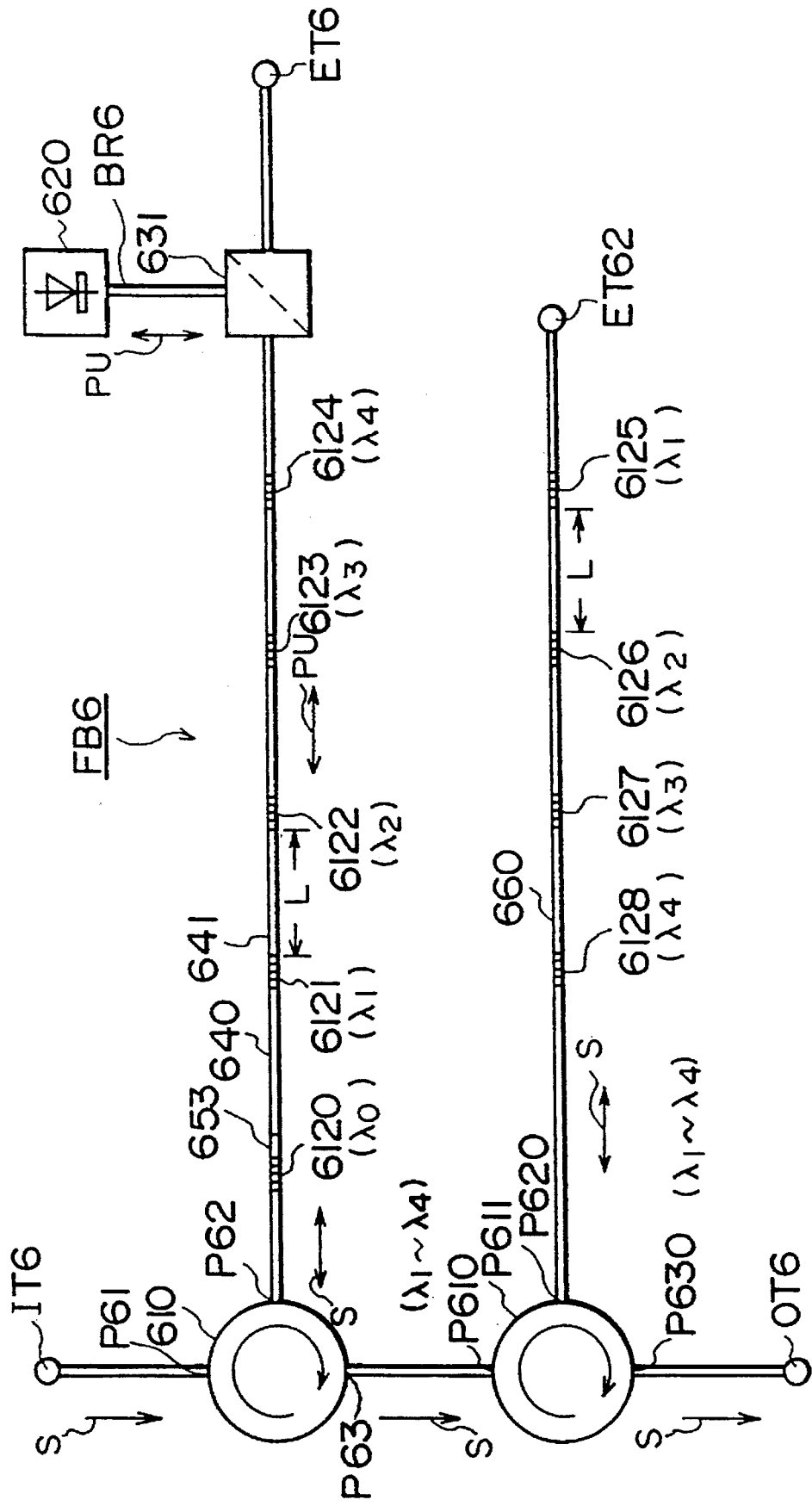
FIG. 7 is a view showing the arrangement of an optical fiber amplifier according to the third embodiment of the present invention.

The system shown in FIG. 7 includes a the first optical circulator 610, having first, second, and third ports P61, P62, and P63, for outputting the signal light S, input through the first port P61, from the second port P62, and outputting the signal light S, input through the second port P62, from the third port P63.

A first amplification fiber 640 is connected to the second port P62 of the first optical circulator 610, for amplifying the signal light S passing through the second port P62 of the first optical circulator 610.

A second amplification fiber 641 is connected to the first amplification fiber 640, for amplifying the signal light S passing through the first amplification fiber 640.

A first reflecting means 6121 is connected to the first and second amplification fibers 640 and 641, for reflecting the first light signal S1 sand transmitting the second light signal S2.

A second reflector means 6122 is connected to the second amplification fiber 641 such that the second amplification fiber 641 is arranged between the first and second reflectors 6121 and 6122, for selectively reflecting the second light signal S2.

A second optical circulator 611, having the first, second, and third ports P610, P620, and P630, outputs the signal light S, input through the first port P610 of the second optical circulator 611, from the second port P620 of the second optical circulator 611, and outputs the signal light S, input through the second port P620 of the second optical circulator 611, from the third port P630 of the second optical circulator 611. The first port P610 of the second optical circulator 611 is connected to the third port P63 of the first optical circulator 610.

The compensation optical fiber 660 is connected to the second port P620 of the second optical circulator 611, for compensating a time difference between the first and second light signals S1 and S2 caused when the second light signal S2 passes between the first and second reflectors 6121 and 6122.

Next, the system shown in FIG. 7 is explained in more detail.

FIG. 7 shows the optical fiber amplifier according to the third embodiment of the present invention. In this optical fiber amplifier, a main path is arranged, along which signal light travels from the incident termination to the exit termination via the optical circulators 610 and 611. An amplification path is connected to the optical circulator 610. Along the amplification path, signal light sequentially passes through the diffraction grating write optical fiber 653, the amplification optical fiber FB6, and an optical multiplexing/demultiplexing unit 631, and returns to pass through these components again in the reverse order. In addition, a branch path BR6 is connected to the optical multiplexing/demultiplexing unit 631. Along this path, pump light PU from a pump light source 620 reaches the amplification path. Furthermore, a compensation path 660 is connected to the optical circulator 611. Along this path, signal light S reciprocates in the compensation optical fiber 660.

The optical circulators 610 and 611 are three-terminal optical circulators whose planes of deflection are respectively constituted by rotating Faraday elements and the like. The optical circulator 610 outputs wavelength-division-multiplexed signal light from the incident termination to the diffraction grating write optical fiber 653, and outputs signal light from the diffraction grating write optical fiber 653 to the second optical circulator 611. The optical circulator 611 outputs the wavelength-division-multiplexed signal light from the optical circulator 610 to the compensation optical fiber 660, and outputs signal light from the compensation optical fiber 660 to the exit termination. The pump light source 620 is a light-emitting element such as an LD. The pump light source 620 generates pump light and outputs it to the optical multiplexing/demultiplexing unit 630. Note that the signal light has wavelength components $\lambda_1$ to $\lambda_4$ with an input intensity $P_S$. The pump light PU has a wavelength component $\lambda_0$ with an input intensity $P_E$.

The grating fiber 653 and the compensation optical fiber 660 are optical fibers respectively having the same refractive index distributions as those of optical fibers connected to their termination portions and allowing easy formation of diffraction grating by doping a large amount of Ge or the like. The amplification optical fiber FB6 is an Er-doped glass optical fiber obtained by doping a small amount of Er, as an active substance for optical amplification, into mainly the core portion. The diffraction grating 6120 is formed in the diffraction grating write optical fiber 653. The diffraction gratings 6121 to 6124 are formed in the amplification optical fiber FB6. Note that each of the diffraction gratings 6120 to 6128 is an optical fiber grating having a refractive index change pattern formed in the cladding or core by irradiating interference fringes formed by ultraviolet rays from an Ar laser or the like according to a general holographic method or phase grating method. These diffraction gratings 6120 to 6124 respectively have reflection wavelength regions $\lambda_{Ri}$ with central wavelengths $\lambda_i$ at a sufficiently large suppression ratio. In this case, i=0, 1, ..., 4. The diffraction gratings 6125 to 6128 respectively have reflection wavelength regions $\lambda_{Ri}$ with central wavelengths $\lambda_{i-4}$ at a sufficiently large suppression ratio. In this case, i =5, ..., 8.

The grating fiber 653 transmits signal light S from the optical circulator 610 to output it to the amplification optical fiber FB6, and transmits signal light S from the amplification optical fiber FB6 to output it to the optical circulator 610. In addition, the grating fiber 653 causes the diffraction grating 6120 to reflect pump light PU from the amplification optical fiber 643 and outputs it to the amplification optical fiber FB6. The amplification optical fiber FB6 amplifies the signal light S from the diffraction grating fiber 653 by stimulated emission of Er pumped by pump light PU from the optical multiplexing/demultiplexing unit 631. The amplification optical fiber 643 also causes the diffraction gratings 6121 to 6124 to reflect the wavelength components $\lambda_1$ to $\lambda_4$ of the signal light to amplify them, and outputs them to the diffraction grating write optical fiber 653. In addition, the amplification optical fiber 643 transmits signal light containing other wavelength components and outputs it to the optical multiplexing/demultiplexing unit 631.

The optical multiplexing/demultiplexing unit 631 is a directional coupling type WDM fiber coupler, which outputs the pump light from the pump light source 620 to the amplification optical fiber FB6, and outputs the signal light S from the amplification optical fiber FB6 to a reflectionless termination ET6. The compensation optical fiber 660 causes the diffraction gratings 6125 to 6128 to respectively reflect the wavelength components $\lambda_1$ to $\lambda_4$ of the signal light S from the second optical circulator 611, and outputs them to the second optical circulator 611. In addition, the compensation optical fiber 660 transmits signal light S containing other wavelength components and outputs it to the reflectionless termination ET62.

In this case, fiber lengths $L(\lambda_1)$ to $L(\lambda_4)$ of the portions of the amplification optical fiber FB6 through which the wavelength components $\lambda_1$ to $\lambda_4$ of the signal light S respectively pass are set on the basis of the absorption/stimulated emission sectional area of Er as an active substance with respect to the wavelengths $\lambda_1$ to $\lambda_4$, in consideration of the intensity of the pump light, the concentration distribution of the active substance, and other fiber structures. In addition, fiber lengths $L'(\lambda_i)$ of the portions of the compensation optical fiber 660 through which the wavelength components $\lambda_1$ to $\lambda_4$ of the signal light respectively pass are set such that values $L(\lambda_i) + L'(\lambda_i)$ become equal to each other. In this case, i=1, ..., 4.

The diffraction gratings 6120 to 6128 are formed in the grating fiber 653, the amplification optical fiber FB6, and the compensation optical fiber 660. In place of these diffraction gratings 6120 to 6128, dielectric multilayer filters having a thickness of several ten μm and the same reflection wavelengths as those of the diffraction gratings may be inserted to be perpendicular to the optical axis.

The function of the third embodiment will be described next.

Pump light PU emitted from the pump light source 620 sequentially passes through the optical multiplexing/demultiplexing unit(WDM) 631, the amplification optical fiber FB6, and the diffraction grating fiber 653. The pump light PU reflected by the diffraction grating 6120 in the grating fiber 653 passes through the amplification optical fiber FB6 and the optical multiplexing/demultiplexing unit 631 in the opposite direction. As a result, Er doped, as an active substance for optical amplification, into the core portion is pumped to cause population inversion.

In this case, wavelength-division-multiplexed signal light S input to the optical circulator 610 through the incident termination IT is output to the amplification optical fiber FB6 via the diffraction grating write optical fiber 653. In the amplification optical fiber FB6, the wavelength components $\lambda_1$ to $\lambda_4$ of the signal light S are amplified by stimulated emission of Er as an active substance and are respectively reflected by the diffraction gratings 6121 to 6124. As a result, the wavelength components $\lambda_1$ to $\lambda_4$ of the signal light S are amplified again and output to the diffraction grating write optical fiber 653.

The wavelength components $\lambda_1$ to $\lambda_4$ of the signal light, which have returned to the grating fiber 653 in this manner, are output to the optical circulator 611 via the optical circulator 610. Meanwhile, wavelength components other than the wavelength components $\lambda_1$ to $\lambda_4$ of the signal light S sequentially pass through the grating fiber 653, the amplification optical fiber FB6, and the optical multiplexing/demultiplexing unit 631 and are output to the reflectionless termination ET6.

In addition, the wavelength components $\lambda_1$ to $\lambda_4$ of the signal light S input from the second optical circulator 611 to the compensation optical fiber 660 are respectively reflected by the diffraction gratings 6125 to 6128 and output to the exit termination via the optical circulator 611. Meanwhile, wavelength components other than the wavelength components $\lambda_1$ to $\lambda_4$ of the signal light pass through the compensation optical fiber 660 to be output to the reflectionless termination.

Since the fiber lengths $L(\lambda_1)$ to $L(\lambda_4)$ of the portions of the amplification optical fiber through which the wavelength components $\lambda_1$ to $\lambda_4$ of the signal light respectively pass are set on the basis of the absorption/stimulated emission sectional area of the active substance with respect to the wavelengths $\lambda_1$ to $\lambda_4$, each of the wavelength components $\lambda_1$ to $\lambda_4$ of the signal light S is amplified to obtain a predetermined gain. If, for example, these four fiber lengths are set to be the optimal values for optical amplification characteristics based on the input intensity of pump light with respect to the wavelengths $\lambda_1$ to $\lambda_4$, gains $G(\lambda_1)$ to $G(\lambda_4)$ of the wavelength components $\lambda_1$ to $\lambda_4$ of the signal light are maximized. In addition, if these four fiber lengths are set in the order of increasing magnitude with respect to the wavelengths $\lambda_1$ to $\lambda_4$ having gains arranged in the order of decreasing magnitude in the optical amplification characteristics based on the intensity of pump light, the gains $G(\lambda_1)$ to $G(\lambda_4)$ of the wavelength components $\lambda_1$ to $\lambda_4$ of the signal light S are made equal to each other.

Assume that the diffraction grating write speed of signal light is high, and the diffraction grating write distance varies depending on the wavelength components of the signal light. Generally, in this case, phase advance and delay occur between these wavelength components, and diffraction grating write data of the wavelength components shift from each other as a function of time. In addition, assume that the wavelength components of signal light have approximated wavelengths, and the suppression ratio of the reflectances of a plurality of diffraction gratings for selectively reflecting these wavelength components is not sufficiently high. In this case, identical wavelength components are reflected by different diffraction gratings, and the diffraction grating write data of these wavelength components overlap each other as a function of time. As described above, when signal light has undergone high-speed diffraction grating write processing and has adjacent wavelength components, the diffraction grating write data of the signal light may shift or overlap, resulting in a deterioration in diffraction grating write quality.

In this embodiment, however, since the fiber lengths $L(\lambda_i)$ and $L'(\lambda_i)$ of the portions of the amplification optical fiber FB6 and the compensation optical fiber 660 through which the wavelength components $\lambda_i$ of the signal light respectively pass are set such that the values $L(\lambda_i)+L'(\lambda_i)$ become equal to each other, phase advance and delay between the wavelength components of the signal light are reduced. In addition, since the suppression ratio of the reflectances of the diffraction gratings 6120 to 6128 are set to be sufficiently high, reflection of identical wavelength components of signal light by a plurality of diffraction gratings is reduced. Since the problem that the diffraction grating write data of signal light shift or overlap can be solved, the signal light diffraction grating write quality improves.

Since the pump light is not reflected by the diffraction grating 6120 in the diffraction grating write optical fiber 653, no pump light PU leaks to the exit termination via the optical circulators 610 and 611. Therefore, the active substance in each amplification optical fiber can be effectively pumped.

Figure 18:
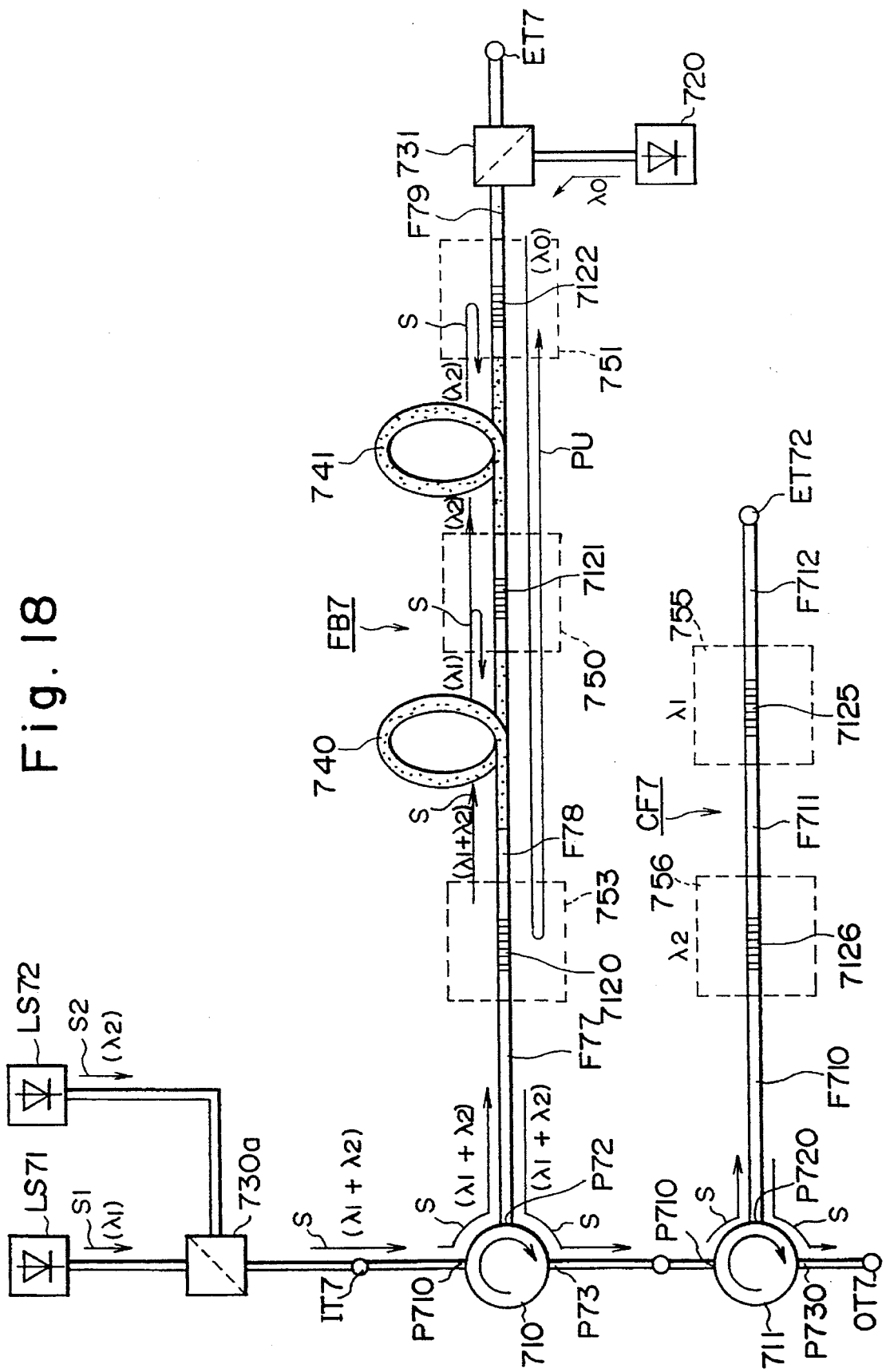
FIG. 18 shows the optical transmission system using light sources and compensation fiber.

FIG. 18 shows a system relating to the system shown in FIG. 7. The system shown in FIG. 18 comprises the first and second light sources LS71, LS72 such as laser diodes. These light sources LS71, LS7 respectively output the first and second light signals S1, S2. This system has compensation fiber CF7 connected to the second optical circulator 711. The second optical circulator 711 has a first ports P710, a second port P720 and a third port P730. The compensation fiber CF7 has the first reflecting fiber 7125, and the second reflecting fiber 7126 connected to the fiber 7125, and second circulator 711. The compensation fiber CF7 does not include Er. The compensation fiber CF7 is made of glass, and it includes Ge in its core. The first light signal S1 with wavelength $\lambda_1$ is output from the first light source LS71, and the second light signal S2 with wavelength $\lambda_2$ is output from the second light source LS72. The first and second light signals S1, S2 are multiplexed with the wavelength division multiplexer 730a, and are input into the first optical circulator 710 through the input termination IT7. The signal light S including two signals S1, S2 is output through the second port P72 of the first circulator 710, and introduced into the optical fiber F77 which connects the first reflecting fiber 753 to the second port P72 of the first circulator 710.

In this system, the signal light S input through the first port P71 of the optical circulator 710 is output from the second port P72 of the optical circulator 710. The Er doped fibers 740, 741 are spliced with ordinary fiber 750, and the fiber 750 has the grating 7121 formed therein. The second Er doped fiber 741 and the wavelength division multiplexer 731 are connected with the fibers 751, F79. The second reflecting fiber 751 has the second grating 7122 formed therein. The pump light PU output from the light source 720 travels through the WDM 731 and fibers F79, 751, and is introduced into the second and first amplification fibers 740, 741. Then, the pump light PU is reflected by the third reflecting fiber 753 having grating 7120 formed therein, and travels back to the WDM 731. The noise light is absorbed in the reflection less termination E77. In this system, the signal light S is amplified by passing through the amplification fibers 740, 741, while the pump light PU is introduced into the amplification fibers 740, 741. As a result, the signal light S output from the third port P73 includes the first and second light signals S1, S2 respectively amplified at substantially constant amplification factor. However, there exits delay time between the first and second signals S1, S2 output from the third port P73 of the first optical circulator 710.

This system comprises the compensating fiber CF7 for compensate the delay time. The compensating fiber CF7 comprises: the optical fiber F710 connected to the second port P72 of the second optical circulator 711; the second reflector 756 of the compensation fiber CF7, for selectively reflecting the second signal S2, being connected to the optical fiber F710; and the first reflector 755 of the compensating fiber CF, being connected to the second reflector 756. The first reflector 755 of the compensating fiber CF7 is an optical fiber 755 with the grating 7125 formed therein. The second reflector 756 of the compensating fiber CF7 is an optical fiber 756 with the grating 7126 formed therein. The relationship between the amplification fiber FB7 and the compensation fiber CF7 shown in FIG. 18 is explained by using FIG. 21A and FIG. 21B. FIG. 21A shows the amplification fiber FB7. The first reflecting fiber 750 has a core 50a and a cladding 50b. The first grating region 7121 is formed in the core 50a. The grating region 7121 has a plurality of core regions X1, X2, X3, X4, X5, X6, X7, X8. The index in the core regions X1–X8 are higher than another core regions in this grating 7121. The distance between the core regions X1 and X2 is $(\lambda_1+d\lambda)/2$. The distance between the core regions X6 and X8 is $(\lambda_1-d\lambda)/2$. Where the $d\lambda$ is a variable value.

The interval between the core regions X1, X2 near the first amplification fiber 740 is greater than that of the core regions X7, X8 near the second amplification fiber 750.

The second reflecting fiber 751 has a core 51a and a cladding 51b. The second grating region 7122 is formed in the core 51a. The grating region 7122 has a plurality of core regions X10, X11, X12, X13, X14, X15. The index in the core regions X10–X15 are higher than another core regions in this grating 7122. The distance between the core regions X10 and X11 is $(\lambda_2+d\lambda)/2$. The distance between the core regions X14 and X15 is $(\lambda_2-d\lambda)/2$. Wherein the $d\lambda$ is a variable value less than 3 nm.

The interval between the core regions X10, X11 near the second amplification fiber 741 is greater than that of the core regions X14, X15 near the fiber F79.

The minimum distance between the first grating region 7121 and second grating region 7122 is L. In other words, the distance between core regions X8 and X10 is L.

In the compensation fiber CF7, the grating region 7126 is arranged near the second circulator 711 closer than the grating region 7125.

The first reflecting fiber 7125 for compensation has a core 55a and a cladding 55b. The first grating region 7125 for compensation is formed in the core 55a. The grating region 7125 has a plurality of core regions X101, X102, X103, X104, X105, X106, X107, X108. The index in the core regions X101–X108 are higher than another core region in this grating 7125. The distance D101 between the core regions X101 and X102 is $(\lambda_1+d\lambda)/2$, and it is equal to the distance D1. The distance D102 between the core regions X107 and X108 is $(\lambda_1-d\lambda)/2$, and it is equal to the distance D2. Wherein the $d\lambda$ is a variable value less than 3 nm.

The interval between the core regions X101, X102 near the fiber F712 is greater than that of the core regions X108, X109 near the fiber F711.

The second reflecting fiber 756 for compensation has a core 56a and a cladding 56b. The second grating region 7126 is formed in the core 56a. The grating region 7126 has a plurality of core regions X110, X111, X112, X113, X114, X115. The index in the core regions X110–X115 are higher than another core regions in this grating 7126. The distance D111 between the core regions X110 and X111 is $(\lambda_2+d\lambda)/2$, and it is equal to the distance D11. The distance D112 between the core regions X114 and X115 is $(\lambda_2-d\lambda)/2$, and it is equal to the distance D12. Wherein the $d\lambda$ is a variable value less than 3 nm.

The interval between the core regions X110, X111 near the fiber F711 is greater than that of the core regions X114, X115 near the second circulator 711.

The minimum distance between the first and second grating region 7125 and 7126 for compensation is L. In other words, the distance between core regions X108 and X110 is L. Accordingly, the distance between the core regions X108 and X110 is equal to the distance between the core regions X8 and X10.

Figure 19:
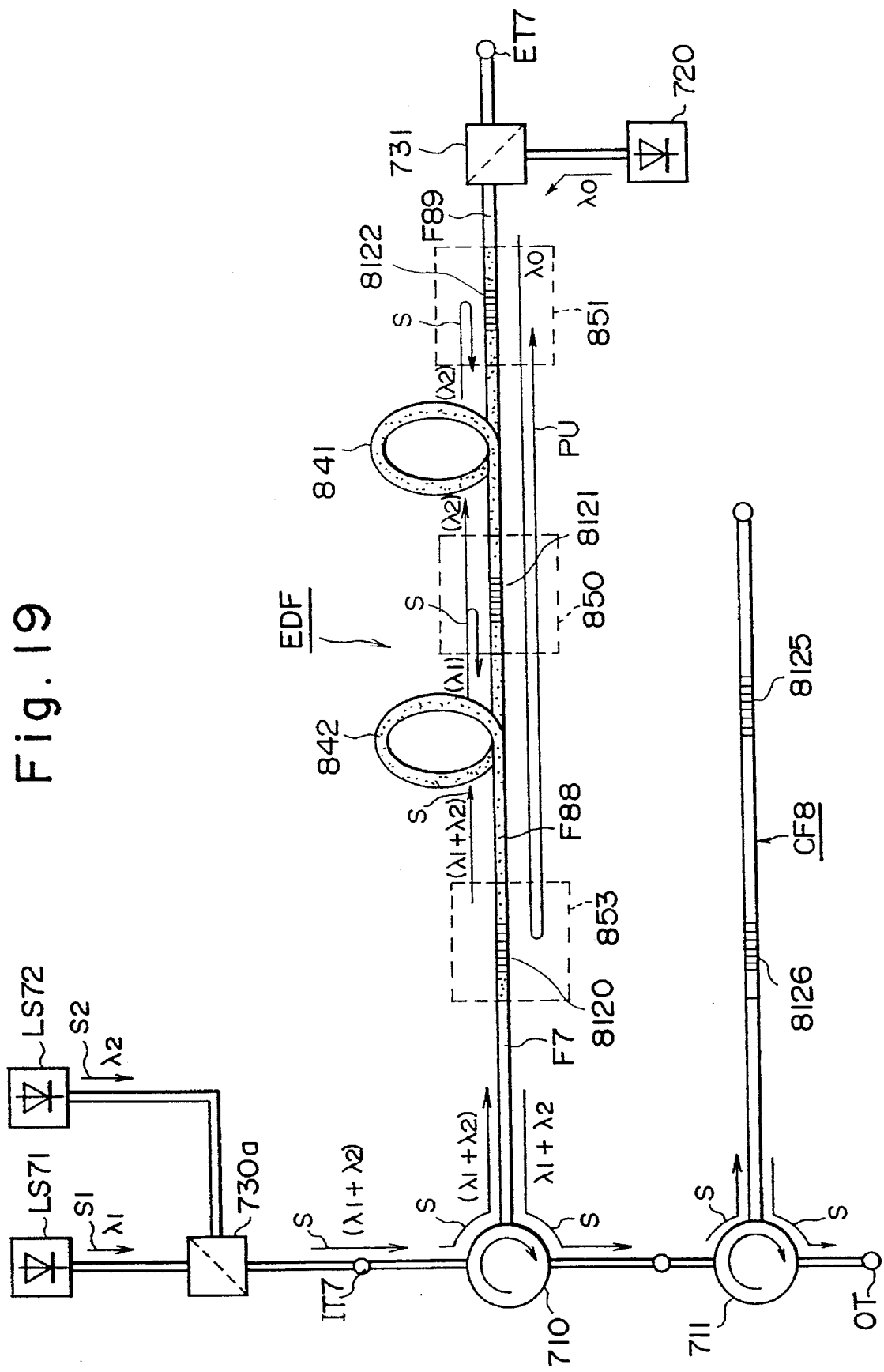
FIG. 19 shows the optical transmission system relating to FIG. 18, using continuous Er doped fiber.

FIG. 19 shows a system relating to the system shown in FIG. 18. This system in this figure has an amplification fiber EDF without joint. In the system shown in FIG. 18, the fibers F77, 753, F78, 750, 751, F79 include no active dopant such as Er, Nd, or Pr. On the other hand, in FIG. 19, the Er doped fiber EDF includes a first reflector 850, a second reflector 851, a third reflector 853, a first amplification fiber 840, and a second amplification fiber 841 all of which include Er. The Er doped fiber EDF has no joint therein. The configuration of the system shown in the FIG. 19 is the same as that of the system shown in FIG. 18, except that the fibers 853, F88, 840, 850, 841, 851 include Er, and there is no joint in the Er doped fiber EDF. Further, there is no joint in the compensation fiber CF8. The fibers 853, 850, and 851 have gratings 8120, 8121, 8122 formed therein. The compensation fiber CF8 has grating regions 8126, 8126 formed therein. The grating region 8120 selectively reflects the pump light PU emitting from the light source 720. The grating region 8121 selectively reflects the first light signal S1, and the grating region 8122 selectively reflects the second light signal S2. The grating region 8126 selectively reflects the amplified second light signal S2', and the grating region 8125 selectively reflects the amplified first light signal S1'.

Figure 20:
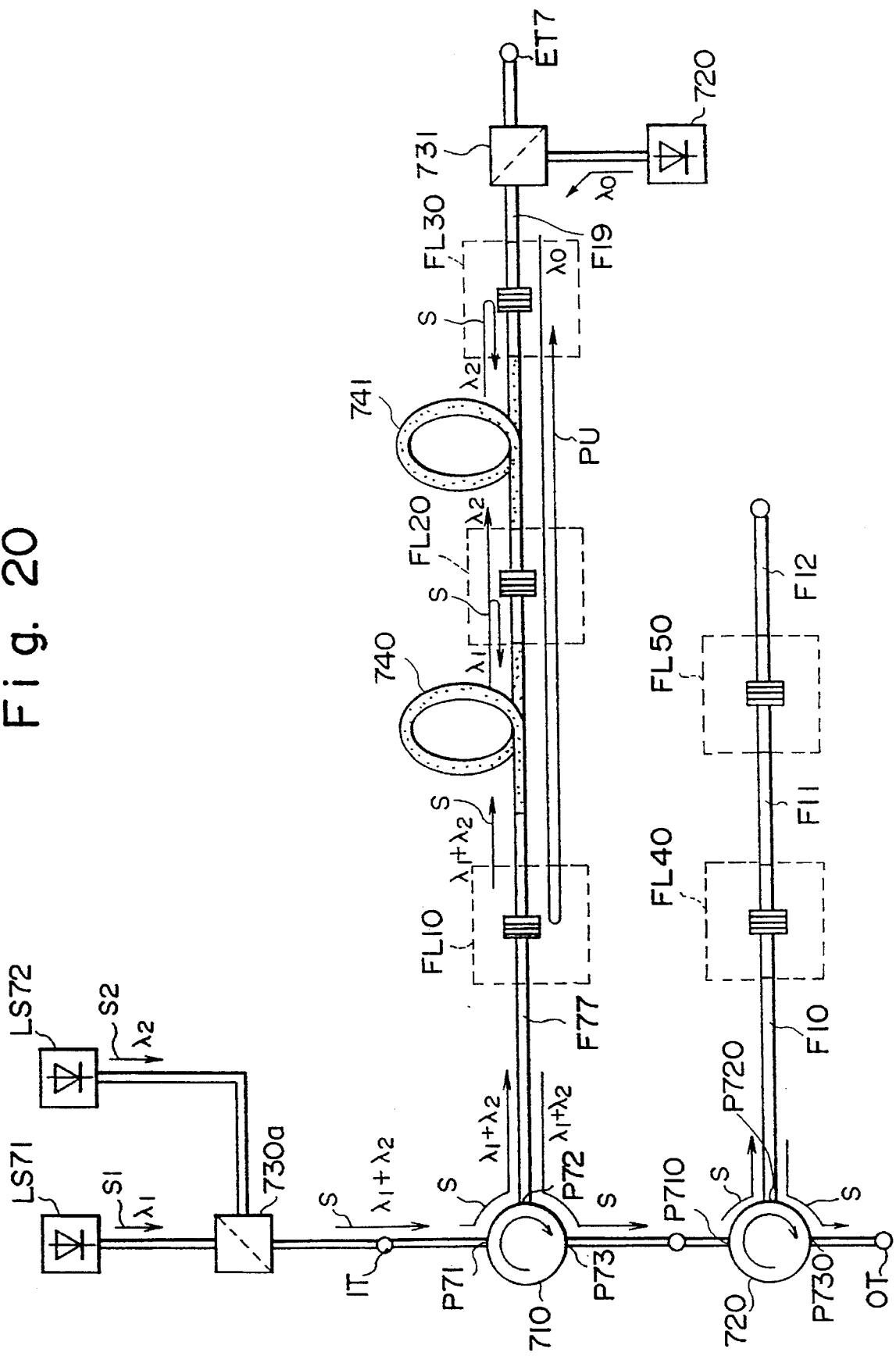
FIG. 20 shows the optical transmission system using a dielectric multilayer reflecting mirror as the reflector.

The function shown in FIG. 18 may be realized by using reflectors FL10, FL20, FL30, FL40 and FL50 instead of the grating fibers shown in FIG. 18. This system is shown in FIG. 20. In this system, the reflectors FL10, FL20, FL30, FL40 and FL50 have dielectric multilayer filters FL1, FL2, FL3, FL4, FL5 instead of the gratings shown in FIG. 18.

Figure 8:
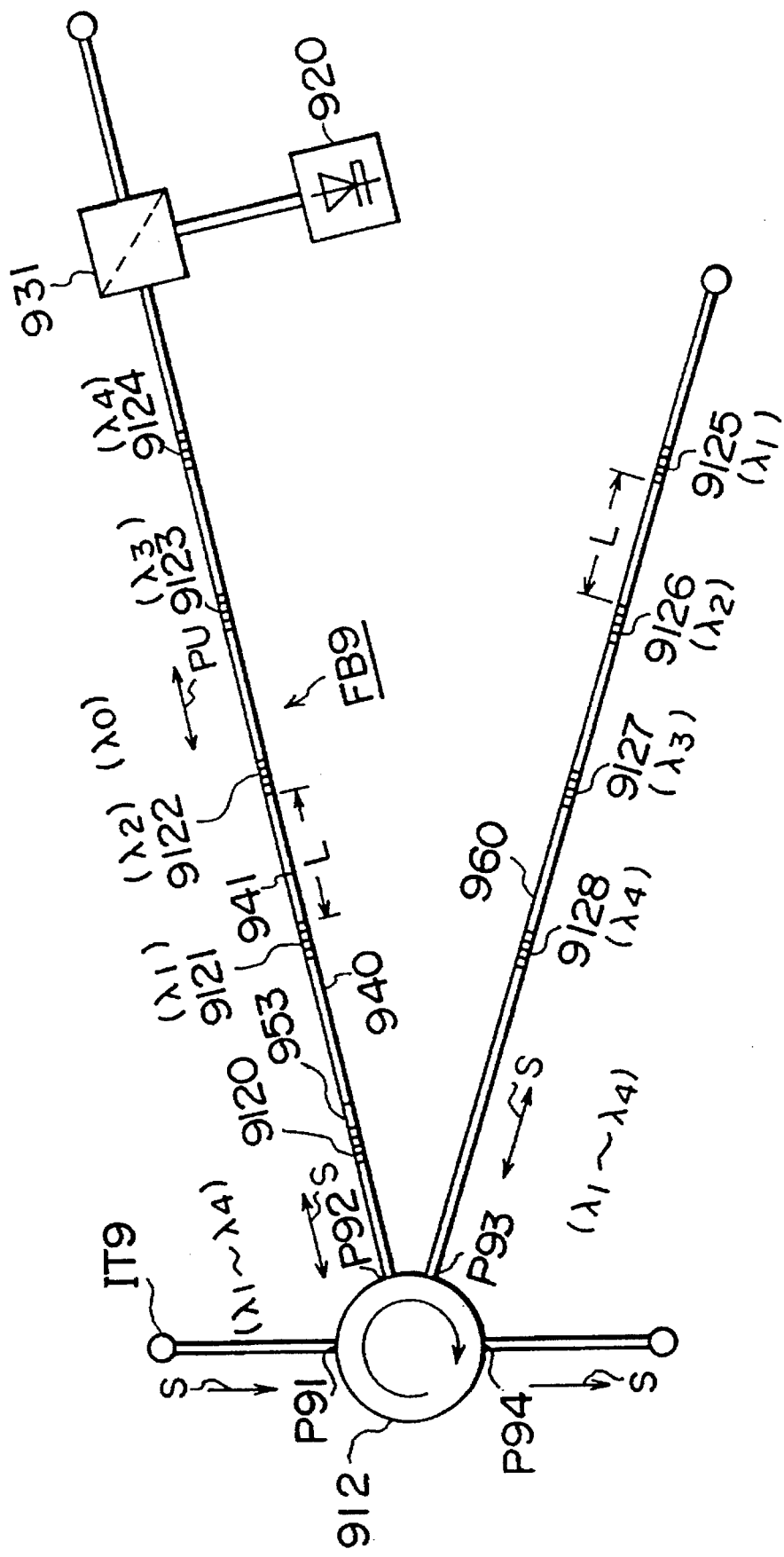
FIG. 8 is a view showing the arrangement of a modification of the third embodiment.

This function may be realized by the system shown in FIG. 8. A first optical circulator 912 has a first port P91, a second port P92, a third port P93 and a fourth port P94. The fourth port P94 outputs a light signal S input through the third port P93 of the first optical circulator 912. This system includes a compensation optical fiber 960, connected to the third port P93 of the first optical circulator 912, for compensating for a time difference $\delta 1$ between first and second light signals S1' and S2' caused when they pass through an amplification fiber FB9. This compensation optical fiber 960 includes a plurality of diffraction gratings (grating regions) 9125, 9126, 9127 and 9128 as well. These diffraction gratings 9125 to 9128 may be dielectric multilayer filters 9125 to 9128.

That is, the system shown in FIG. 8 includes an optical circulator 912, having first, second, third, and fourth ports P91, P92, P93, and P94, for outputting light signal S, input through the first port P91, from the second port P92, outputting the signal light S, input through the second port P92, from the third port P93, and outputting the signal light, input through the third port P93, from the fourth port P94.

A first amplification fiber 940 is connected to the second port P92 of the optical circulator 912, for amplifying the signal light S passing through the second port P92 of the optical circulator 912.

A second amplification fiber 941 is connected to the first amplification fiber 940, for amplifying the signal light S passing through the first amplification fiber 940.

A a first reflector 9121 is connected to the first and second amplification fibers 940 and 941, for reflecting a first light signal S1 and transmitting a second light signal S2.

A second reflector 9122 is connected to the second amplification fiber 941 such that the second amplification fiber 941 is arranged between the first and second reflectors 9121 and 9122, for selectively reflecting the second light signal S2.

A the compensation optical fiber 960 is connected to the third port P93 of the optical circulator 912, for compensating for the time difference $\delta 1$ between the first and second light signals S1 and S2 caused when the second light signal S2 passes between the first and second reflectors 9121 and 9922.

This compensation optical fiber 960 includes the diffraction gratings 9125 and 9126 separated from each other by a distance equal to a distance L between the first and second reflectors 9121 and 9122. These diffraction gratings 9125 and 9126 may be dielectric multilayer filters 9125 and 9126.

Next, the system shown in FIG. 8 is described in more detail.

FIG. 8 shows a modification of the third embodiment. This optical fiber amplifier has almost the same arrangement as that of the third embodiment except that the optical circulators 610 and 611 are replaced with the optical circulator 912. The optical circulator 912 is a four-terminal optical circulator whose plane of deflection is constituted by a Faraday element and the like. The optical circulator 912 outputs wavelength-division-multiplexed signal light from the incident termination IT9 to the diffraction grating fiber 953, and outputs signal light S from the diffraction grating fiber 953 to the compensation optical fiber 960. In addition, the optical circulator 912 outputs signal light from the compensation optical fiber 960 to the exit termination.

According to this arrangement, almost the same function as that of the third embodiment can be obtained. Especially, since fiber lengths $L(\lambda_1)$ and $L'(\lambda_i)$ of the portions of the compensation optical fiber 960 through which wavelength components $\lambda_i$ of signal light respectively pass are set such that values $L(\lambda_i)+L'(\lambda_i)$ become equal to each other, phase advance and delay between the wavelength components of the signal light are reduced. In addition, since the suppression ratio of the reflectances of the diffraction gratings 9120, 9121, 9122, 9123, 9124, 9125, 9126, 9127 and 9128 is set to be sufficiently high, reflection of identical wavelength components of the signal light by a plurality of diffraction gratings is reduced.

With this function, since the problem that the diffraction grating write data of signal light shift or overlap can be solved, the signal light diffraction grating write quality improves.

Figure 9A:
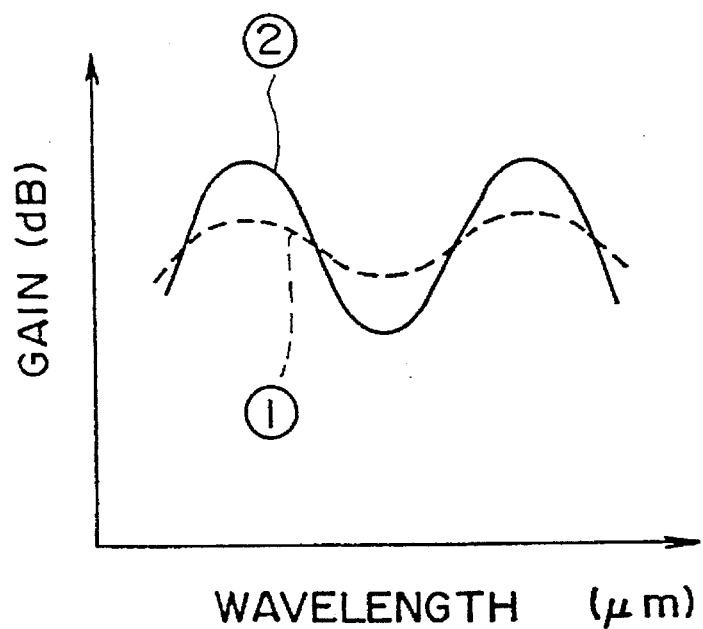
FIGS. 9A and 9B are graphs showing spectra indicating the signal light wavelength-gain characteristics of an optical communication system using both an optical fiber amplifier of the present invention and a conventional optical fiber amplifier.
Figure 9B:
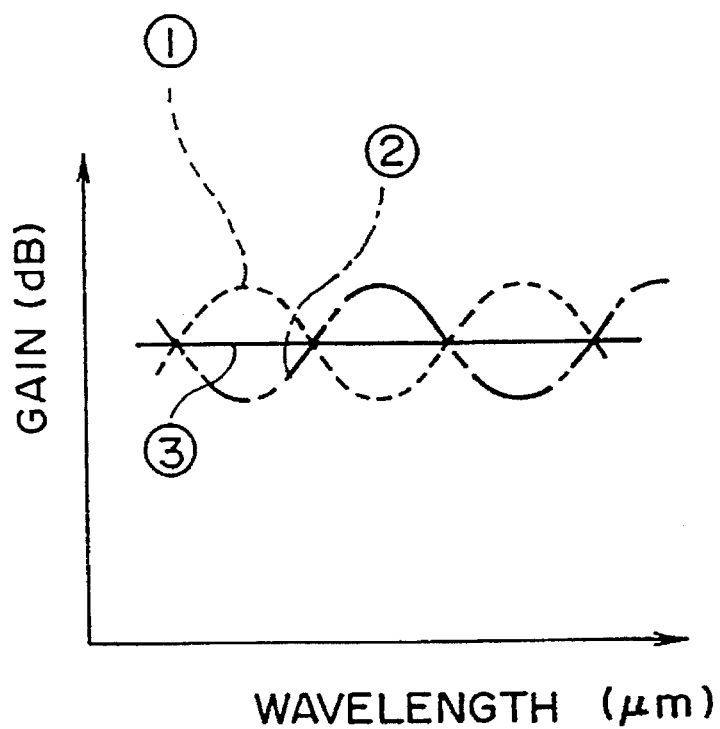

An optical communication system using the optical fiber amplifiers of the respective embodiments will be briefly described next. FIG. 9A shows the signal light wavelength-gain characteristics of an optical communication system using the optical fiber amplifier shown in FIG. 10 thorough 13. FIG. 9B shows the signal light wavelength-gain characteristics of the optical communication system using both the conventional optical fiber amplifier and the optical fiber amplifier of the present invention.

In the conventional optical fiber amplifier shown in FIG. 10 to 13, the signal light wavelength-gain characteristics exhibit a relatively high wavelength dependency, as indicated by the dotted line in FIG. 9A. For this reason, in the optical communication system having such optical fiber amplifiers repeated and connected in a multistage, the wavelength dependency of the signal light wavelength-gain characteristics may become higher than that of a system having a single optical fiber amplifier, as indicated by the solid line in FIG. 9A.

In the optical fiber amplifier of the present invention, however, the wavelength dependency of the signal light wavelength-gain characteristics can be greatly reduced, as shown in FIG. 6B. For this reason, even in the optical communication system having such optical fiber amplifiers repeated and connected in a multistage, the wavelength dependency of the signal light wavelength-gain characteristics is relatively low.

As described above, in the optical fiber amplifier of the present invention, signal light wavelength-gain characteristics can be arbitrarily set. In this case, when conventional optical fiber amplifiers are repeated and connected in a multistage, the signal light wavelength-gain characteristics exhibit a relatively high wavelength dependency, as indicated by the dotted line in FIG. 9B.

Assume that the signal light wavelength-gain characteristics of the optical fiber amplifier of the present invention are set to be opposite to the characteristics indicated by the dotted line, as indicated by the chain line in FIG. 9B.

In this case, an optical communication system having the conventional optical fiber amplifier (FIG. 13) and the optical fiber amplifier of the present invention (FIG. 16) connected in series, the wavelength dependency of the signal light wavelength-gain characteristics can almost be eliminated, as indicated by the solid line in FIG. 9B.

The present invention is not limited to the above embodiments, and various modifications can be made within the spirit and scope of the invention.

For example, in each embodiment described above, pump light is input to one or the other termination of an amplification optical fiber. However, pump light from a pump light source may be split into two light beams to be respectively input to the two terminations of the amplification optical fiber via two optical multiplexing/demultiplexing units, or pump light beams from two pump light sources may be respectively input to the two terminations of the amplification optical fiber via two optical multiplexing/demultiplexing units. With this arrangement, the same function and effect as those described above can be obtained.

In addition, in each embodiment described above, an optical fiber grating is formed or connected, as a means for reflecting pump light, in or to an amplification optical fiber or a diffraction grating write optical fiber. However, in place of this optical fiber grating, a fiber mirror may be connected to an end face of an amplification optical fiber. With this arrangement, the same function and effect as those described above can be obtained.

As has been described in detail above, according to the present invention, wavelength-division-multiplexed signal light from the first optical circulator is amplified by the amplification optical fiber. In this amplification optical fiber, the respective wavelength components of the signal light are respectively reflected by the corresponding first reflecting means to be amplified again, and return to the first optical circulator. In this case, the fiber lengths of the portions of the amplification optical fibers through which the respective wavelength components of the signal light pass are set on the basis of the absorption/stimulated emission sectional area of an active substance with respect to the reflection wavelengths of the respective first reflecting means, in consideration of the input intensity of the pump light, the concentration distribution of the active substance in the amplification optical fiber, and other fiber structures. Therefore, a plurality of different wavelength components of the signal light are amplified to obtain a predetermined gain.

The optical fiber amplifier of the present invention, therefore, can reduce variations in optical amplification characteristics with respect to signal light having a plurality of different wavelength components and hence can be suitably used for wavelength division multiplex communication.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 17690/1994 filed on Feb. 14, 1994 is hereby incorporated by reference.

What is claimed is:

1. An optical system for amplifying signal light containing first and second light signals respectively having first and second wavelengths, comprising:

(a) a first optical circulator, having first, second, and third ports, wherein light input through the first port is output through the second port, and wherein light input through the second port is output through the third port;

(b) a first amplification fiber for amplifying light passing therethrough, said first amplification fiber being connected to the second port of said first optical circulator;

(c) a second amplification fiber for amplifying light passing therethrough, said second amplification fiber being connected to said first amplification fiber;

(d) first reflecting means for connecting said first amplification fiber to said second amplification fiber, said first reflecting means reflecting the first light signal, and transmitting the second light signal; and (e) second reflecting means for selectively reflecting the second light signal, said second reflecting means being connected to said second amplification fiber such that said second amplification fiber is arranged between said first and second reflecting means.

2. A system according to claim 1, said system further comprising:

a first light source outputting said first light signal; and a second light source outputting said second light signal.

3. A system according to claim 1, wherein the signal light input through the first port of said first optical circulator is output from the second port of said first optical circulator, the first light signal of the signal light output from the second port of said first optical circulator reciprocates in said first amplification fiber to be amplified, the second light signal of the signal light output from the second port of said first optical circulator reciprocates in said first and second amplification fibers to be amplified, and the amplified signal light is output from the third port of said first optical circulator, so that the first and second light signals having different wavelengths are amplified at a uniform amplification factor.

4. A system according to claim 1, further comprising a reflectionless termination which is connected to said second amplification fiber such that said second amplification fiber is arranged between said first reflecting means and said reflectionless termination, so that no unnecessary light is output from the third port of said first optical circulator.

5. A system according to claim 1, wherein said first and second amplification fibers are Er-doped fibers.

6. A system according to claim 1, wherein said first reflecting means is an optical fiber diffraction grating incorporating a diffraction grating.

7. A system according to claim 1, wherein said first reflecting means is a dielectric multilayer filter.

8. A system according to claim 1, wherein said second reflecting means is an optical fiber diffraction grating incorporating a diffraction grating.

9. A system according to claim 1, wherein said second reflecting means is a dielectric multilayer filter.

10. A system according to claim 6, wherein said first and second amplification fibers and said optical fiber diffraction grating are an Er-doped fiber.

11. A system according to claim 6, wherein said optical fiber diffraction grating is a fiber obtained by forming a diffraction grating in a general optical fiber in which no Er is doped.

12. A system according to claim 1, further comprising (f) a second optical circulator, having first, second, and third ports, for outputting a light signal, input through the first port of said second optical circulator, from the second port of said second optical circulator, and outputting a light signal, input through the second port of said second optical circulator, from the third port of said second optical circulator, the first port of said second optical circulator being connected to the third port of said first optical circulator.

13. A system according to claim 10, further comprising a compensation optical fiber, connected to the second port of said second optical circulator, for compensating for a phase difference between the first and second light signals which is caused when the first and second light signals pass through said fiber amplifier.

14. A system according to claim 11, wherein said compensation optical fiber has a plurality of diffraction gratings.

15. A system according to claim 1, wherein said first optical circulator has a fourth port from which a light signal input through the third port of said first optical circulator is output, and said system further comprises a compensation optical fiber, connected to the third port of said first optical circulator, for compensating for a phase difference between the first and second light signals which is caused when the first and second light signals pass through said fiber amplifier.

16. A system according to claim 13, wherein said compensation optical fiber has a plurality of diffraction gratings.

17. An optical system for amplifying signal light containing first and second light signals respectively having first and second wavelengths, comprising:

(a) a first optical circulator, having first, second, and third ports, wherein light input through the first port is output through the second port, and wherein light input through the second port is output through the third port;

(b) a first amplification fiber for amplifying light passing through the second port of said first optical circulator, said first amplification fiber being connected to the second port of said first optical circulator;

(c) a second amplification fiber for amplifying light passing through said first amplification fiber, said second amplification fiber being connected to said first amplification fiber;

(d) first reflecting means for reflecting the first light signal, and transmitting the second light signal, said first reflecting means being connecting said first amplification fiber to said second amplification fiber;

(e) second reflecting means for selectively reflecting the second light signal, being connected to said second amplification fiber such that said second amplification fiber is arranged between said first and second reflecting means;

(f) a second optical circulator, having first, second, and third ports, wherein light input through the first port of said second optical circulator is output through the second port, wherein light input through the second port of said second optical circulator is output through the third port of the second optical circulator, and wherein the first port of said second optical circulator is connected to the third port of said first optical circulator; and (g) a compensation optical fiber, connected to the second port of said second optical circulator, for compensating for a phase difference between the first and second light signals which is caused when the second light signals passes between said first and second reflecting means.

18. A system according to claim 17, wherein said compensation optical fiber includes diffraction gratings arranged to be separated from each other by a distance equal to a distance between said first and second reflecting means.

19. A system according to claim 17, wherein said compensation optical fiber includes two dielectric multilayer filters arranged to be separated from each other by a distance equal to a distance between said first and second reflecting means.

20. A system according to claim 17, wherein said first and second reflecting means are fiber diffraction gratings incorporating diffraction gratings.

21. A system according to claim 17, wherein said first and second reflecting means are dielectric multilayer filters.

22. An optical system for amplifying signal light containing first and second light signals respectively having first and second wavelengths, comprising:

(a) an optical circulator, having first, second, third, and fourth ports, wherein light input through the first port is output through the second port, wherein light input through the second port is output through the third port, wherein light input through the third port is output through the fourth port;

(b) an first amplification fiber for amplifying light outputting through the second port of said optical circulator, being connected to the second port of said optical circulator;

(c) a second amplification fiber for amplifying light passing through said first amplification fiber, being connected to said first amplification fiber;

(d) first reflecting means for reflecting the first light signal, and transmitting the second light signal, said first reflecting means being connecting said first amplification fiber to said second amplification fiber;

(e) second reflecting means for selectively reflecting the second light signal, said second reflecting means being connected to said second amplification fiber such that said second amplification fiber is arranged between said first and second reflecting means; and (f) a compensation optical fiber for compensating for a phase difference between the first and second light signals which is caused when the second light signals passes between said first and second reflecting means, said compensation optical fiber being connected to the third port of said optical circulator.

23. An optical system comprising:

an optical circulator which signal light is input to and output from;

a pump light source for emitting pump light;

a wavelength division multiplexer connected to said optical circulator and said pump light source;

a first amplification fiber connected to said wave division multiplexer and containing an active substance for optical amplification;

a second amplification fiber connected to said first amplification fiber and containing an active substance for optical amplification; and a first optical fiber diffraction grating connected to said first and second amplification fibers and including a first diffraction grating.

24. A system according to claim 23, further comprising a second optical fiber diffraction grating connected to said second amplification fiber and including a second diffraction grating.

25. A system according to claim 23, wherein the active substance is Er.

26. An optical system for amplifying signal light containing first and second light signals respectively having first and second wavelengths, comprising:

first means having first, second and third ports, for outputting light input through the first port to the second port, and outputting light input from the second port to the third port;

first amplification means for amplifying light passing therethrough, being connected to the second port;

second amplification means for amplifying light passing therethrough, being connected to said first amplification means;

first reflecting means for reflecting the first light signal, and transmitting the second light signal, being arranged between said first and second amplification means;

second reflecting means for reflecting the second light signal, being so arranged that said second amplification means is located between said first and second reflecting means.

27. A system according to claim 26, said system further comprising a first light source outputting the first light signal; and a second light source outputting the second light signal.

28. A system according to claim 26, wherein the second wavelength is 8 nm as great as first wavelength.

29. An optical system, comprising:

an amplification fiber comprised of glass, including Er, having a first and a second index modulation type grating therein;

a fiber directly connected to said amplification fiber, not including Er;

a first wave division multiplexer connected to said fiber;

a pump light source outputting pump light to said amplification fiber through said first wave division multiplexer;

an optical circulator connected to said amplification fiber, having an input terminal;

a second wave division multiplexer connected to said input terminal of said optical circulator;

a first light source outputting a first light signal, is connected to said second wave division multiplexer, a second light source outputting a second light signal, is connected to said second wave division multiplexer.

* * * * *